(12) United States Patent
Wigren et al.

(10) Patent No.: US 9,967,769 B2
(45) Date of Patent: May 8, 2018

(54) METHODS AND APPARATUSES FOR RECOVERING DATA PACKET FLOW CONTROL AGAINST RADIO BASE STATION BUFFER RUN AWAY

(71) Applicant: Telefonaktiebolaget L M Ericsson (publ), Stockholm (SE)

(72) Inventors: Torbjörn Wigren, Uppsala (SE); Linda Brus, Vällingby (SE); Anders Jonsson, Täby (SE); Karin Lagergren, Solna (SE); Martin Skarve, Enebyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 14/900,848

(22) PCT Filed: Jun. 28, 2013

(86) PCT No.: PCT/IB2013/001381
§ 371 (c)(1),
(2) Date: Dec. 22, 2015

(87) PCT Pub. No.: WO2014/207494
PCT Pub. Date: Dec. 31, 2014

(65) Prior Publication Data
US 2016/0135075 A1    May 12, 2016

(51) Int. Cl.
*H04W 28/02*    (2009.01)
*H04L 12/825*    (2013.01)
(Continued)

(52) U.S. Cl.
CPC ....... *H04W 28/0278* (2013.01); *H04L 47/263* (2013.01); *H04L 47/30* (2013.01);
(Continued)

(58) Field of Classification Search
CPC .. H04W 28/0278; H04W 24/08; H04W 28/12
See application file for complete search history.

(56) References Cited

U.S. PATENT DOCUMENTS 6,697,615 B1 *  2/2004  Takemura ............. H04W 24/08
                                                   455/423
7,016,970 B2 *  3/2006  Harumoto ............... H04L 47/10
                                                   375/E7.002
(Continued)

FOREIGN PATENT DOCUMENTS

CN    101930215 A    12/2010
CN    102972081 A    3/2013
(Continued)

OTHER PUBLICATIONS

Li, Xing-Chun et al., "Feedforward-feedback Composite Controller Design of Process Control Systems", Modular Machine Tool & Automatic Manufacturing Technique, Jun. 2012, pp. 1-4.
(Continued)

*Primary Examiner* — Jamal Javaid
(74) *Attorney, Agent, or Firm* — Murphy, Bilak & Homiller, PLLC

(57) ABSTRACT

Recovery control is provided for recovering data packet flow control between a network node (14) and a radio base station (18) over a radio network interface (2). The base station communicates with at least one user equipment, UE, (10) over a radio interface (3) and measures information relating to a data transmission rate over the radio interface and an amount of a downlink packet queue (22) in the base station associated with the UE communication. In one embodiment, the base station sends at least some of the measurement information to the network node. A process controller (52, 40, 84) in the network node processes the measurement information to determine a desired amount to be stored in the downlink packet queue. The process controller determines a
(Continued)

commanded bit rate to transmit data from the network node to the downlink packet queue based on the determined desired amount and transmits data to the radio base station in accordance with the commanded bit rate.

26 Claims, 20 Drawing Sheets

(51) Int. Cl.
*H04W 28/14* (2009.01)
*H04L 12/835* (2013.01)
*H04W 24/08* (2009.01)
*H04W 28/12* (2009.01)
*H04W 92/12* (2009.01)
*H04L 12/801* (2013.01)

(52) U.S. Cl.
CPC ........... *H04W 24/08* (2013.01); *H04W 28/12* (2013.01); *H04W 28/14* (2013.01); *H04L 47/29* (2013.01); *H04W 92/12* (2013.01)

(56) References Cited

U.S. PATENT DOCUMENTS

| | | |
|---|---|---|
| 9,112,797 B2 | 8/2015 | Ludwig et al. |
| 2002/0068588 A1 | 6/2002 | Yoshida et al. |
| 2007/0010290 A1* | 1/2007 | Iida ..................... H04W 88/181 |
| | | 455/560 |

FOREIGN PATENT DOCUMENTS

| | | |
|---|---|---|
| EP | 1603359 A1 | 12/2005 |
| EP | 1732340 A1 | 12/2006 |
| EP | 1892899 A2 | 2/2008 |

OTHER PUBLICATIONS

Necker, Marc C. et al., "Impact of Iub Flow Control on HSDPA System Performance", 2005 IEEE 16th International Symposium on Personal, Indoor and Mobile Radio Communications, Sep. 11-14, 2005, pp. 3-7.

* cited by examiner

METHODS AND APPARATUSES FOR RECOVERING DATA PACKET FLOW CONTROL AGAINST RADIO BASE STATION BUFFER RUN AWAY

TECHNICAL FIELD

The technology relates to packet data flow control in a radio communications system.

BACKGROUND

Current cellular systems provide browsing the internet and access to services on the internet. The packet data that the cellular system transmits to the end user in these situations must be handled differently than for circuit-switched speech in that the cellular system should maintain a steady flow of packets between the internet source and the end user so that services are not interrupted. Packet data flow control (referred to simply as flow control) in Wideband Code Division Multiple Access (WCDMA) helps achieve this goal. Flow control in WCDMA is distributed between two nodes: the radio network controller (RNC) and the radio base station (RBS). The RBS is responsible for maintaining a steady flow of packets to the User Equipment (UE) over the air interface in order to provide a satisfactory user experience, e.g., during web browsing. FIG. 1 is a diagram used to explain WCDMA flow control.

The RNC is responsible for ensuring that data is available in the RBS for transmission, and to facilitate this, the RNC sends Radio Link Control (RLC) data via a Transport Network (TN) to the RBS. The RNC thereby affects the buffer level in the RBS by sending RLC PDU's to the RBS via a TN Frame Protocol (FP). The RBS sends capacity allocations (CA) as input to the RNC, and the RNC typically responds by sending an appropriate amount of data with the specified rate to the RBS over the Iub interface.

Because the RLC protocol is terminated in the RNC and in the UE, any RLC data residing in an RBS queue is seen as delayed by the RLC entities involved in the data transmission between the RNC and the UE. As a result, the RNC will, at poll timer expiry, poll data that has already been transmitted from the RNC to the RBS but which is still residing in the RBS queue for the UE, and consequently, not yet acknowledged by the UE. Thus, if the amount of data in the RBS Priority Queue (PQ) (a term used in WCDMA) is large and the data rate over the air interface (Uu) is low, then the RLC entity in the RNC will poll the RLC entity in the UE as to whether it has received a particular data packet, even though no data has been lost. Consequently this will lead to unnecessary retransmissions of RLC packet data units (PDU's) with a poll bit set or poll superfields (POLL_SUFI's).

Another problem is posed by RLC retransmissions. RLC retransmissions delayed by data already buffered in the PQ can lead to multiple requests for the same data even though the previously retransmitted data is already in transit, but still buffered in the RBS PQ. In this delayed retransmissions situation, the UE may, due to timer status prohibit expiry or other status reporting trigger, send additional RLC status reports before the initial retransmission even has been transmitted to the UE over the air interface leading to a situation where multiple copies of the same data will be sent both over the TN and the Uu interface. This results in an inefficient use of the TN and air interface resources since the additional copies of retransmitted RLC PDU's do not contribute to the user experienced throughput since they will be discarded as duplicates by the receiving RLC entity in the UE.

In traditional WCDMA downlink flow control, i.e., for High Speed Downlink Packet Access (HSDPA), the RNC arranges received downlink packets in a queue herein referred to as the RNC queue, and transmits packages to the RBS according to the maximum bitrates for transmission over the Iub interface.

A more recent flow control approach, such as Active Queue Management (AQM) flow control or Distributed Active Queue Management (D-AQM), avoids buildup in the RNC queue at the RNC by allowing the RNC to forward data to the RBS as soon as possible. This results in queuing in the RBS and not in the RNC, in contrast to traditional WCDMA flow control which attempts to limit the queue length in the RBS in order to avoid spurious RLC retransmissions. As a result, the RLC Round Trip Time (RTT) can be expected to vary over a greater range for a TN relying on D-AQM flow control as opposed to a TN that uses traditional flow control. One way to handle this would be to increase the RLC timers that are used to monitor the maximum allowed queue delays, but this would result in poor performance due to lower peak throughput and excessive polling delays in certain scenarios, such as short data transmissions when only the last RLC PDU (which carries the poll) is lost.

While D-AQM attempts to adjust the PQ buffer length in the RBS to the Uu rate, typically targeting a certain buffer length or dwell time, the Uu bit rate for services over the radio interface varies significantly over short periods of time, sometimes resulting in large PQ's and low Uu bit rates. In these instances, it takes time for the RBS to shorten the PQ and adjust to the lower Uu bit rate, leading to an increased RLC RTT and subsequent delay of RLC polls and retransmissions. Consequently, D-AQM may have difficulty in maintaining a desired queue (PQ) length which may lead to wasted bandwidth both in the TN and radio network (RAN) due to the unnecessary transmission of polls and multiple copies of RLC retransmissions.

One objective of flow control is to effectively utilize the air interface between the RBS and the UE since radio spectrum is a scarce resource. If the flow of data packets is interrupted or slowed down unnecessarily, then the user or cell throughput suffers. For this reason it is important to keep the priority queues (PQs) of the RBS non-empty with a suitable margin (a typical but example margin is 125 ms) to avoid poor user throughput.

Another important flow control objective is to avoid the amount of data buffered in the PQ becoming too large and the packet dwell time in the PQ becoming too long. Stated differently, flow control should aim to keep the PQ in the RBS as short as possible while ensuring that enough data is available to fully utilize the air interface capacity. In addition to the problems already noted above, a large RBS PQ leads to large losses of data at High Speed-Downlink Shared Channel (HS-DSCH) cell changes, which also leads to a large number of RLC retransmissions.

Yet another problem is that aggressive TCP applications do not always respond to traditional flow control schemes such as Active Queue Management (AQM) congestion control based on premeditated packet drops. An example of an aggressive TCP application is one which starts a large number of TCP flows in parallel, each carrying only a small amount of data. In such scenarios, traditional AQM schemes may fail to maintain the RBS buffer within targeted values, leading to an excessive PQ buffer build-up. The effect is long download times as illustrated in FIG. 2, which is a graph showing an example of RBS buffer dwell time when AQM flow control is used in a WCDMA system. When multiple data flows are suddenly started, an AQM buffer dwell time "run away" situation occurs, as pointed out in the Figure.

SUMMARY

The technology in this application includes methods and apparatus that provide recovery flow control for recovering data packet flow control between a network node and a radio base station over a radio network interface.

The network node obtains measurement information relating to a data transmission rate over the radio interface from the radio base station to at least one UE and an amount of a downlink packet queue in the base station associated with the UE communication. A process controller in the network node processes the measurement information to determine a desired amount to be stored in the downlink packet queue. The process controller determines a commanded bit rate to transmit data from the network node to the downlink packet queue based on the determined desired amount. The network node transmits data to the radio base station in accordance with the commanded bit rate. The processing, determining, and transmitting steps may be repeated as needed.

In one example embodiment, the obtaining measurement information includes receiving a message from the radio base station with some or all of the measurement information.

In another example embodiment, a used data volume is calculated using the commanded bit rate, e.g., until a next measurement information message is received from the radio base station. One or more data packets that exceed the calculated used data volume are discarded from a buffer in the network node used to store data packets for a data flow associated with the UE.

In example embodiments, the process controller performs linear time invariant process control to determine the commanded bit rate. A reference amount of data is determined using a reference dwell time and the measured bit rate over the radio interface. The determined reference amount of data is provided to the process controller which processes the determined reference amount of data along with the measurement information using linear time invariant process control to determine the commanded bit rate. The commanded bit rate is preferably limited to a non-negative value. The process controller preferably takes into account a first delay associated with transmitting data packets from the network node to the radio base station and a second delay associated with signaling the measurement information from the radio base station to the network node. In one example implementation, the process controller includes a feedback lead-lag controller and a feed forward controller.

The recovery control process is distributed. The radio base station measures information relating to a data transmission rate over the radio interface from the radio base station to the at least one UE and an amount of a downlink packet queue in the base station associated with the UE communication. The base station sends the measurement information to the network node and then receives data from the network node at a commanded bit rate based on the measurement information such that a desired amount of data is stored in the downlink packet queue. Like the network node, the base station may repeat the measuring, sending, and receiving steps one or more times as needed.

In one example embodiment, prior to activating the recovery control method, a normal operation flow control process was used by the radio base station to control the transmission of data to the UE. After deactivating the recovery control method, the base station returns to that normal operation flow control process.

In example embodiments, the recovery control method may be activated when a dwell time for data packets stored in the downlink packet queue exceeds a first dwell time threshold and deactivated when the dwell time for data packets stored in the downlink packet queue is less than a second dwell time threshold or an amount of data in the downlink packet queue is less than a data amount threshold.

In an example implementation, the radio base station communicates with the UE using High Speed Downlink Packet Access (HSDPA), and the other flow control process is based on flow control-based Active Queue Management (AQM) where the radio base station determines the data transmission rate over the radio interface from the radio base station to the at least one UE.

DESCRIPTION OF NON-LIMITING EXAMPLE EMBODIMENTS

Figure 1:
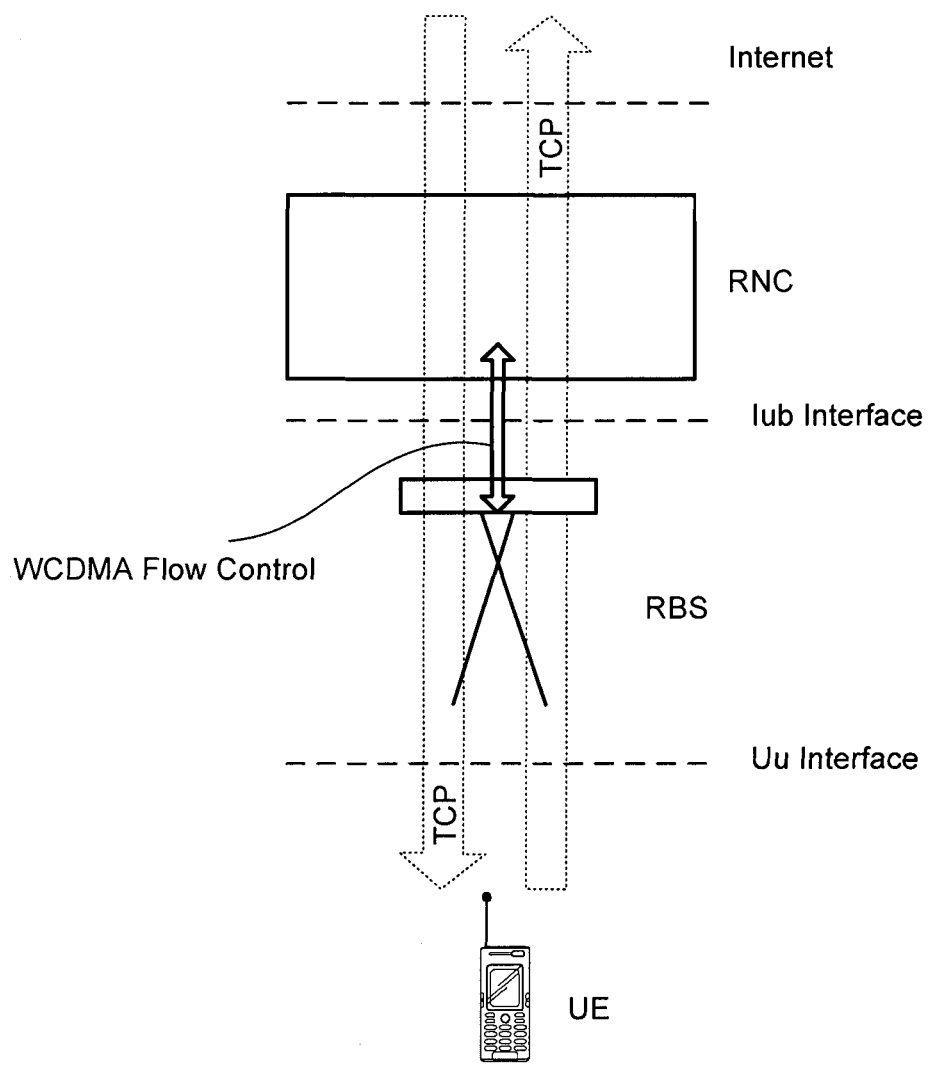
FIG. 1 is a diagram used to explain WCDMA flow control.
Figure 2:
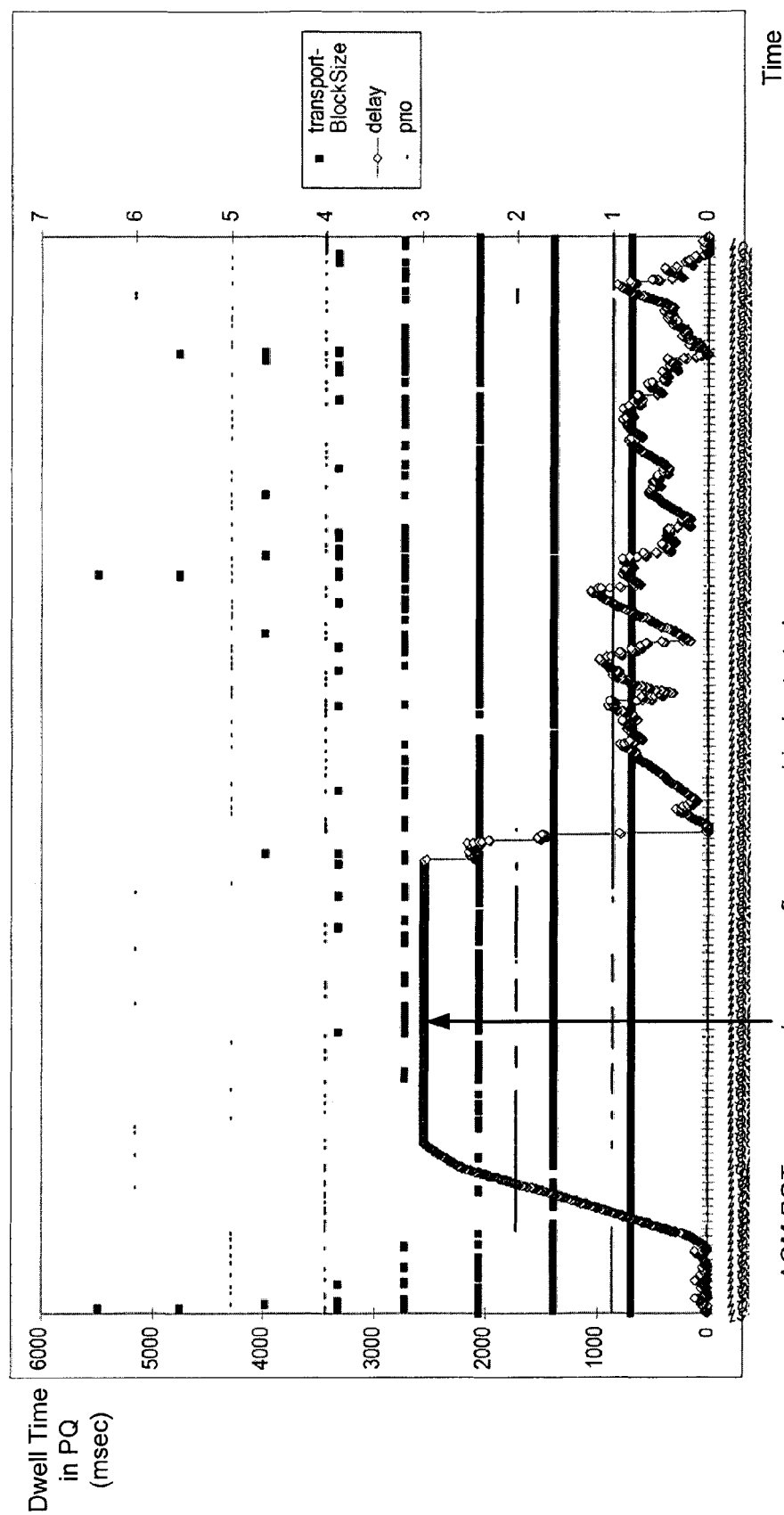
FIG. 2 is a graph showing an example of RBS buffer dwell time when AQM flow control is used in a WCDMA system when multiple data flows are suddenly started.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

It should be understood by the skilled in the art that "UE" is a non-limiting term comprising any wireless device or node equipped with a radio interface allowing at least: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode.

A cell is associated with a base station, where a base station comprises in a general sense any node transmitting radio signals in the downlink (DL) and/or receiving radio signals in the uplink (UL). Some example base stations are eNodeB, eNB, Node B, macro/micro/pico radio base station, home eNodeB (also known as femto base node), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

The signaling described is either via direct links or logical links (e.g. via higher layer protocols and/or via one or more network nodes). For example, signaling from a coordinating node may pass another network node, e.g., a radio node.

The example embodiments are described in the non-limiting example context of a WCDMA-based cellular radio system. However, the technology is not limited thereto, and may apply to any radio communications system including for example an Evolved UMTS Terrestrial Radio Access Network (E-UTRAN) LTE type system.

The policing and recovery flow control technology in this application ensures that radio base station buffer (queue) lengths are maintained at acceptable values. Under baseline conditions, a normal operation flow control procedure operates to control packet flow in the downlink direction towards a UE for one or more data packet flows. Although flow control is applied to each data flow, only the flow control for one data flow is described to simplify the description. A recovery flow control is triggered under predetermined conditions so as to avoid an excessive buffer build-up in the radio base station buffer and is preferably removed when the buffer fill state (i.e., the amount of data stored in the buffer for the data flow) reaches an acceptable level. The radio base station first measures the priority queue dwell time (PQT) of packets in the PQ. If the PQT is equal to or below a certain threshold, then no particular action is taken. However, if the PQT is above that threshold, then the following actions are taken. The radio base station measures (1) the amount of data stored in the base station buffer for the data flow, referred to also as Priority Queue Length (PQL), and (2) a transmitted data rate from the base station to the UE associated with that same data flow. The RBS compares the PQL and PQT to a first set of respective predefined threshold values corresponding to a maximum allowed PQL and a maximum allowed PQT. If both the determined PQL and PQT exceed their respective threshold values, then the radio base station conveys measurement information to a core network or a radio network controller (RNC) node via uplink signaling contained in the uplink frame protocol. In the non-limiting WCDMA example, an RNC is used as the example network node. The RNC uses the data rate and the PQL from a measurement message received from the base station to calculate a Priority Queue Time (PQT). The reception of the information triggers the RNC to initiate recovery flow control. A second set of respective predefined threshold values is used to determine when to deactivate recovery flow control and return to the normal flow control, e.g., flow control orchestrated just at the radio base station. Consequently, these first and second sets of threshold values define the ranges within which recovery flow control is active and limits the flow of data from the RNC to the RBS. So in contrast to known flow control techniques where the RBS alone determines the bit rate requested from the RNC via capacity allocation control frame messages, the recovery flow control technology in this application is selectively applied under certain conditions. The interaction between the RNC and the RBS in the recovery flow control technology distributes the recovery flow control between the RNC and the RBS.

Some initial definitions are set forth to assist in the description but are not intended to be limiting. For example, the term priority queue is used with the understanding that priority queue encompasses other terms for a data store such as queue, buffer, memory, etc. that is used to temporarily store data in the base station prior to transmission over the radio interface.

PQL—packet queue length—the current data volume or amount measured in bits stored in a priority queue (PQ) in the RBS.

Uu bitrate—the current data rate measured in bits/s at which data bits are leaving the PQ for transmission over the air interface from the RBS to the UE.

PQT—packet queue time—the amount of time measured in seconds an incoming data packet will spend in the PQ, given the current PQ data volume and the current radio transmission (Uu) bitrate from the RBS to a UE. PQT is also known as dwell time.

Accordingly, a distributed method and apparatus perform recovery control when the PQT becomes too large, and when the PQT returns to a normal value, flow control is switched back to a normal flow control, e.g., flow control-based AQM in some WCDMA systems.

Figure 3:
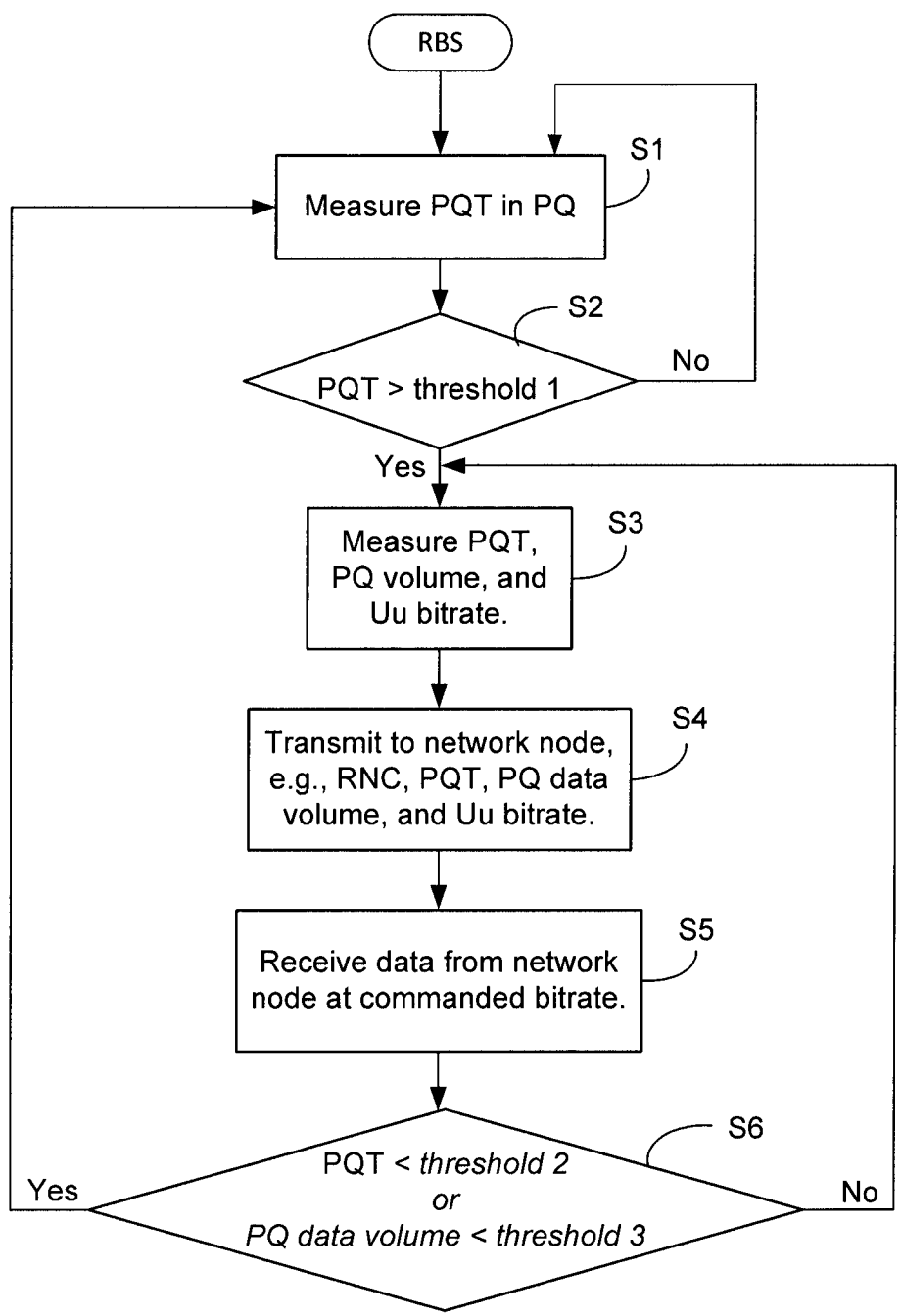
FIG. 3 is a flow chart illustrating example procedures for a radio base station relating to recovery flow control.

FIG. 3 is a flow chart illustrating example procedures for a radio base station relating to recovery flow control in accordance with an example embodiment. In step S1, the RBS measures the current PQT (dwell time in the packet queue) in the RBS. If the PQT does not exceed a first dwell time (PQT) threshold 1, then control returns to step S1. If the PQT exceeds the first dwell time (PQT) threshold 1 (step S2), then the recovery control process is activated, and the RBS starts measuring the current PQ data volume (PQL), which is the amount of a downlink packet queue in the base station associated with the UE communication, and the current Uu bitrate from the RBS to the UE, i.e., the current data transmission rate over the radio interface from the radio base station to the UE (step S3). The RBS signals the measured PQL, PQT, and the Uu bitrate to the RNC (step S4). The RBS receives data from the network node at the commanded bitrate received from the network node (described below) in step S5. The RBS then checks to see if the current PQT<a PQT threshold 2 (a second dwell time threshold) or the current PQ data volume (PQL)<a PQL threshold 3 (a data amount threshold) (step S5). If either condition is met, then the RBS returns to normal flow control and monitors PQT at step S1. If neither condition is met, then the RBS continues with recovery flow control and returns to step S3.

Figure 4:
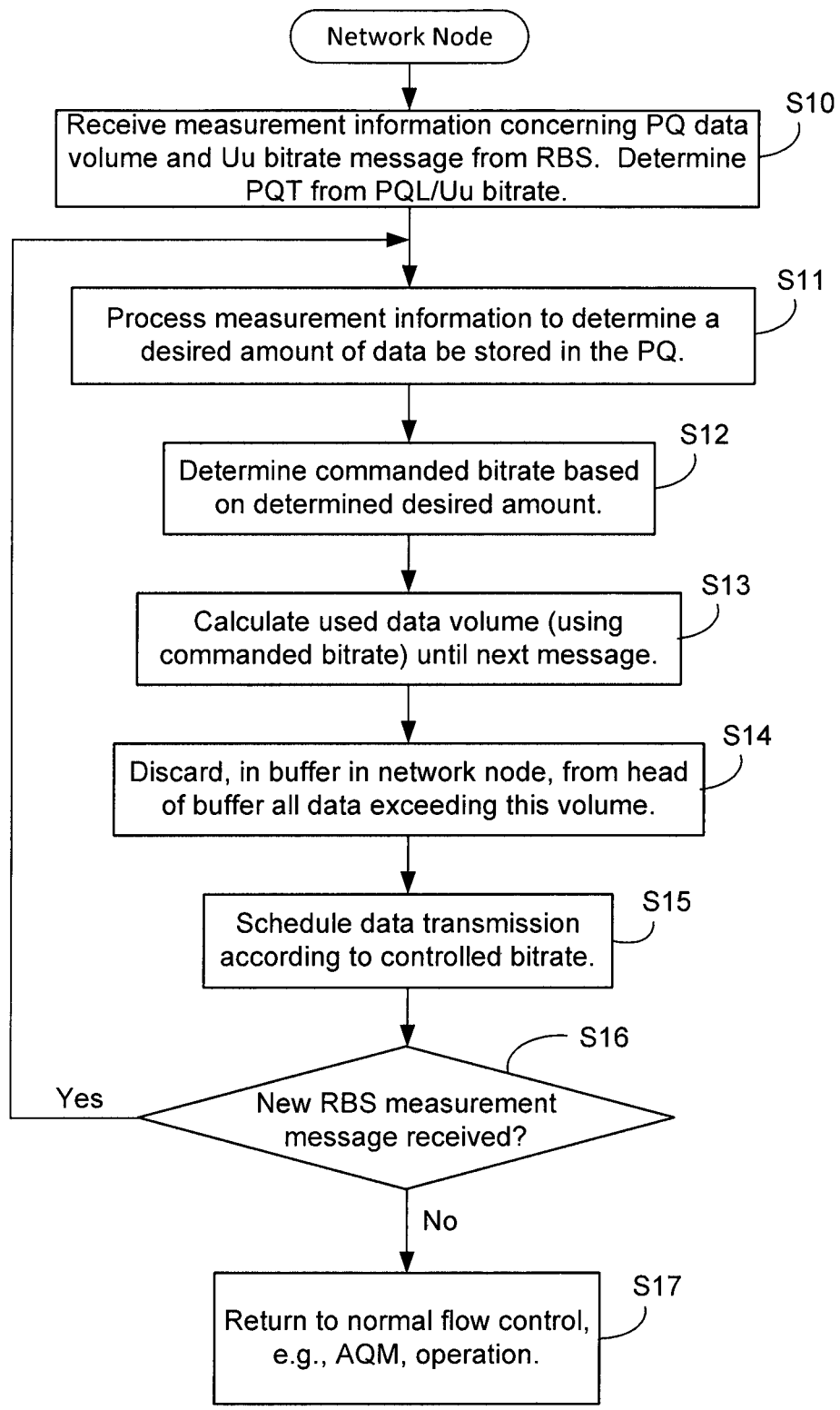
FIG. 4 is a flow chart illustrating example procedures for a network node relating to recovery flow control.

FIG. 4 is a flowchart that illustrates example network node procedures followed by the RNC as the network node in this example. The RNC obtains certain measurement information (step S10) relating to an amount of a downlink packet queue in the base station associated with the UE communication, i.e., PQ data volume or PQL, and a data transmission rate over the radio interface from the radio base station to the UE, i.e., Uu bitrate. A dwell time, i.e., PQT, may be determined using PQT=PQL/Uu bitrate. In one example embodiment, measurement information, e.g., PQL and Uu bitrate, may be measured by and received from the radio base station. In another example embodiment, the RNC may use data transmission rate information already available at the network node, and/or may use a current radio link control (RLC) window size to estimate the PQ data volume instead of receiving either or both of the rate and volume information from the base station. When the RNC receives a measurement information message from the base station, receipt of that message may activate the recovery flow control process in the RNC. However, other triggers to activate the recovery process may be used. The RNC processes the measurement information to determine a desired amount of data to be stored in the PQ (step S11). The RNC determines a commanded bit rate based on the determined desired buffer amount that is to be used for transmission of data from the RNC to the RBS over the Tub interface (step S12).

In an example embodiment detailed below, that commanded bit rate determination is made using a process control-based controller algorithm, sometimes denoted to as a servo controller algorithm. In example embodiments, the servo controller algorithm is a lead lag controller designed to guarantee stability for a predetermined range of signaling and control delays in the control loop between the RNC and the RBS. The RNC calculates a used data volume using the commanded bitrate unit a next message with measurement information is received from the base station (step S13). The RNC may then discard from a buffer in the RNC for the data flow the data packets exceeding the determined buffer amount (step S14). For example, packets could be discarded from one end such as the top of that RNC buffer. Next, the RNC schedules transmission of SDUs from the RNC queue to the RBS at the commanded bit rate (step S15). A decision is made in step S16 whether a new measurement report is received from the RBS. If so, then the RNC returns to step S11 to compute a new commanded bit rate based on the new measurement information. If not, then the RNC (and RBS) returns to normal flow control operation, e.g., AQM flow control (step S17).

Figure 5:
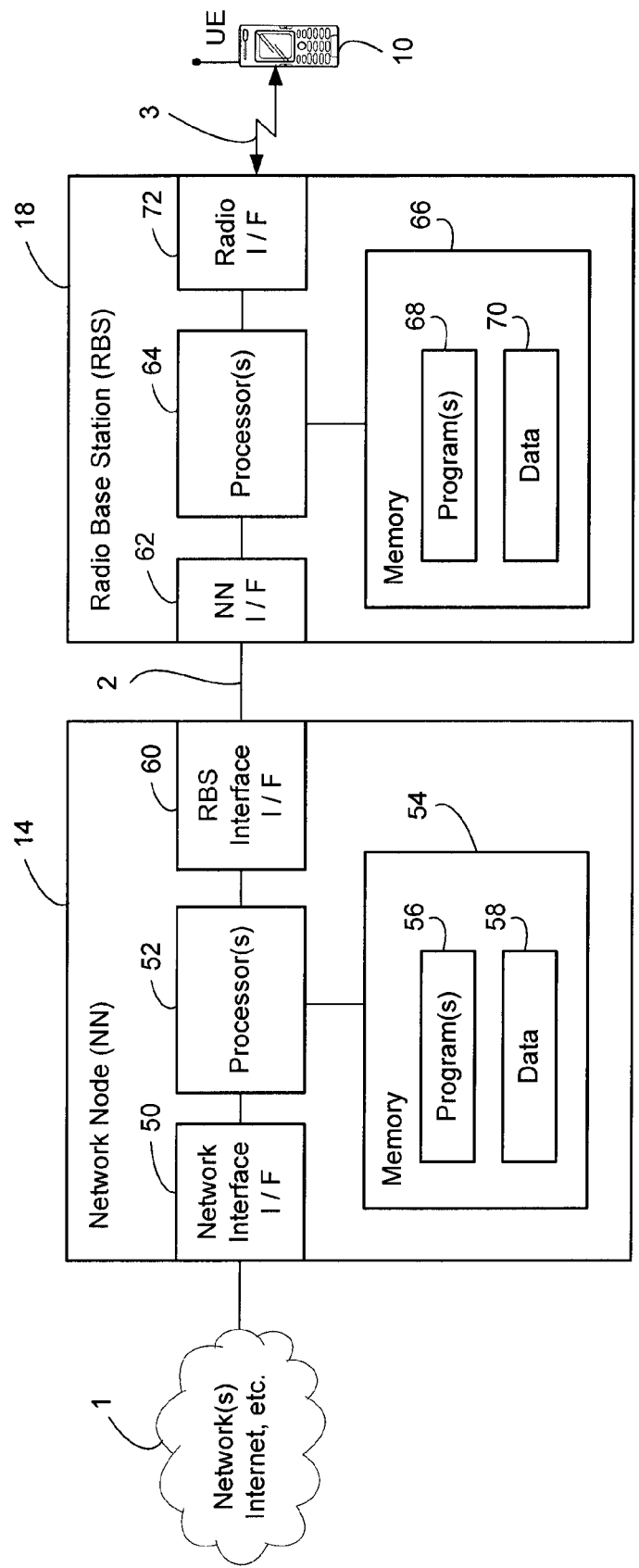
FIG. 5 is a function block diagram showing an example communications system in which the recovery flow control technology may be used.

FIG. 5 is a function block diagram showing an example communications system in which the recovery flow control technology may be used. A network node 14, e.g., a core network node or an RNC, is coupled to one or more networks 1 such the internet etc. via a network interface 50 and to one or more radio base stations (RBSs) 18 via an RBS interface 60. The network node 14 includes one or more data processors 52 coupled to the interfaces 50 and 60 as well as to one or more memories 54 that store program instructions 56 and data 58 needed to implement the recovery flow control operations described in this application. The RBS 18 communicates over a network interface 2 with the network node 14 via a network node interface 62. The RBS 18 also communicates with one or more UEs 10 over a radio interface via a radio interface 72 that includes for example one or more radio transmitters, receivers, antennas, etc. The RBS 18 further includes one or more data processors 64 coupled to the interfaces 62 and 72 as well as to one or more memories 66 that store program instructions 68 and data 70 needed to implement the recovery flow control operations described in this application.

Figure 6:
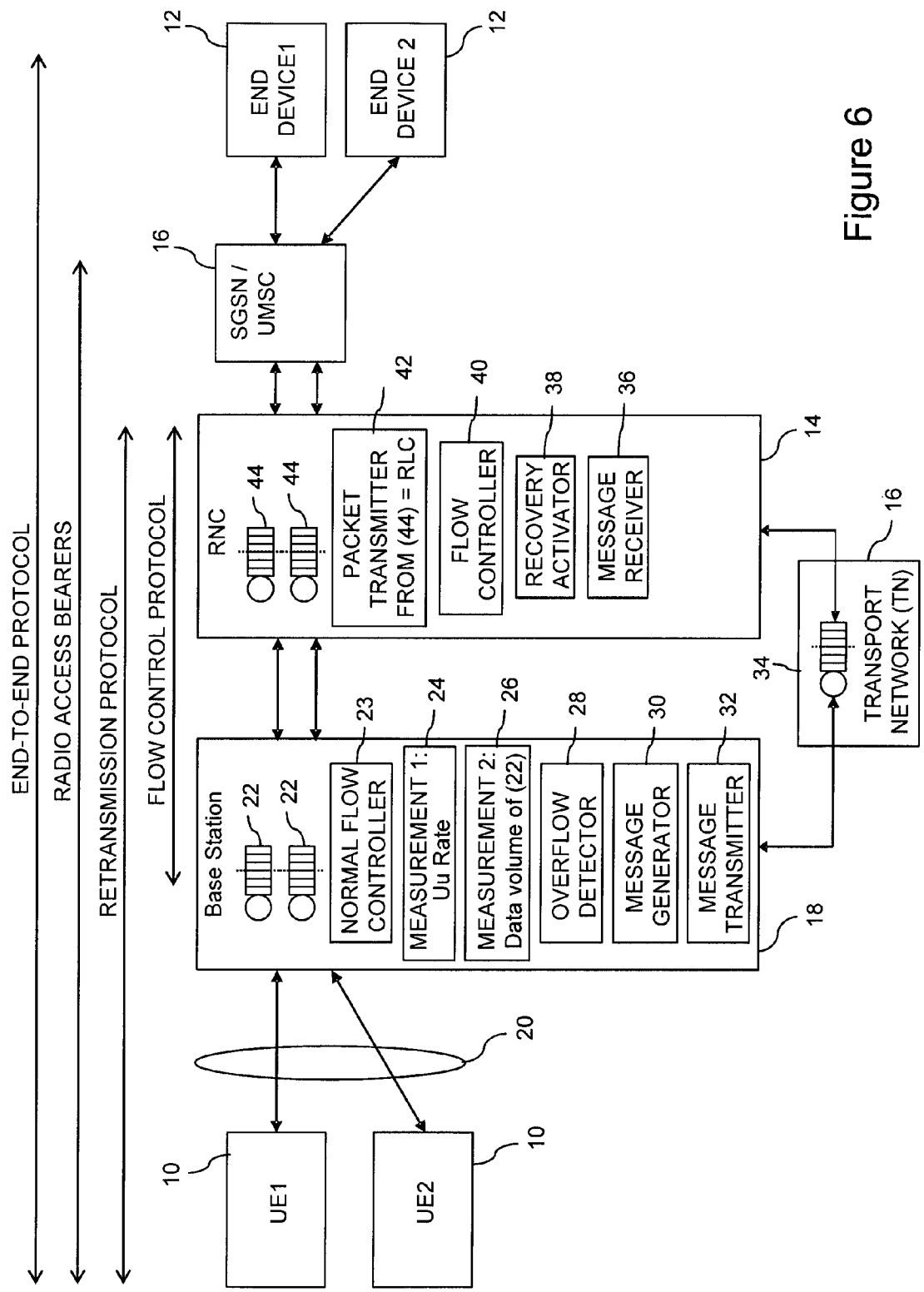
FIG. 6 is a function block diagram showing an example WCDMA HSDPA type communications system in which the recovery flow control technology may be used.

FIG. 6 is a function block diagram showing an example WCDMA HSDPA type communications system in which the recovery flow control technology may be used. The RNC 14 is coupled via a transport network (TN) 16 to a radio base station node 18 to convey data packets from end devices 12 to UEs 10 over a radio interface 25. The transport network 16 is an Iub transport network in this example and may include one or more transport nodes (not illustrated) which are interfaced so as to allow conveying data packets between the RNC 14 and RBS 18. The end devices 12 may correspond to various types of devices, including servers, remote terminals, and further UEs. In addition, a further control node is coupled between the RNC 14 and the end devices 12 and corresponds to a Serving General Packet Radio Service Support Node (SGSN) 16.

As illustrated, different protocols or protocol layers may be used to convey data packets between the end devices and the UEs. FIG. 6 shows an end-to-end protocol implemented between the end devices and the UEs, a retransmission protocol implemented between the RNC 14 and the UEs, and a flow control protocol implemented between the RNC 14 and the RBS 18. The end-to-end protocol is a high layer protocol and, in the illustrated example, may be the of the TCP/IP type (TCP: Transport Control Protocol, IP: Internet Protocol). Other protocol types may be used as well, e.g., UDP (User Datagram Protocol) together with the real-time protocol (RTP) and/or its counterpart, the Real-Time Control Protocol (RTCP) to control the data rate. The retransmission protocol is a lower layer protocol, and in the illustrated example, is the RLC protocol, which is a link layer protocol. According to the retransmission protocol, data packets which were not successfully received are retransmitted, which involves some type of feedback mechanism from the retransmission protocol receiver to the retransmission protocol sender, e.g. by sending acknowledgement packets from the receiver to the sender. FIG. 6 also indicates radio access bearers established between the SGSN node 16 and the UEs. A bearer is considered to be a channel having certain guaranteed transport attributes, e.g. with respect to Quality of Service (QoS).

The RBS 18 includes priority queues (PQs) 22, measurement controllers 24 and 26 for measuring a Uu data rate over the radio interface to a UE a current volume of an associated PQ 22. An overflow detector 26 detects whether a PQ has too high of an associated packet dwell time, in which case, measurements of Uu rate 24 and data volume 26 are initiated. A message generator 30 generates a measurement message when predetermined flow recover conditions are met, such as those described in conjunction with FIG. 3. The measurement message includes measurement information associated with a current PQL, PQT, and Uu date rate for a data flow/PQ. A message transmitter 32 transmits the measurement message from the message generator 30 over the TN 34 to the RNC 14.

The RNC 15 includes packet queues 44 for storing data for the UEs received from the SGSN 16. A message receiver 36 receives measurement messages sent via the TN 34 from the message transmitter 32 and triggers the recovery activator 38 to start recovery flow control for this data flow. The recovery flow controller 40 performs recovery flow control for this flow until deactivated by the recovery activator 38 when the message receiver 36 detects that measurements being sent from the base station message transmitter 32 have stopped. The flow controller 40 sends a commanded data rate determined based on the measurement information using a process control algorithm such as the example described below to the packet transmitter 42. The packet transmitter 42 transmits packets to the RBS 18 at the commanded data rate during recovery flow control for the corresponding data flow. When measurements from the message transmitter 32 have stopped, the normal flow controller 23 is performs normal flow controls.

The inventors designed a recovery flow controller in the context of a process or servo control problem where the controlled signal is steered towards a reference signal. They further determined that the recovery flow controller should also handle a number of constraints of the controlled system, i.e., the PQ in the RBS, that are associated with (1) measurements performed in the RBS, (2) delays associated with signaling these measurements from the RBS to the RNC, (3) the effect of a process control-determined bit rate from the RNC to the RBS, and (4) the need for the process control-determined commanded bit rate to be non-negative.

Constraint (1) concerns a risk that the RBS measurements are subject to some amount of jitter (sampling time instance variations). Delay constraints (2) are associated with the signaling and the effect of the process control-determined bit rate. These delays are not known at the time of design of the recovery flow controller, are time varying, are not measurable within the required on-time of the recovery controller, and have a wide range, e.g., from 10 ms to 130 ms. In fact, the effective delay of the sampling period, the measurement delays, and the commanded data rate signal delay add up, which means that the recovery controller needs to handle an unknown delay. Using non-limiting example delays, the summed delay could be from 10 ms+10 ms+20 ms=40 ms, up to 130 ms+130 ms+20 ms=280 ms. The term handle means that i) performance in terms of settling time to the desired reference signal needs to be as specified for the delays in the above range, and ii) that stability of the controller is ensured for all these delays. Constraint (4) means that any negative control signal needs to be replaced by a nonnegative value. This may adversely impact the recovery controller such that some mitigation may be desirable.

The inventors recognized that the delays are not known and cannot be measured with a high bandwidth, and that there may be jitter. Furthermore, discrete time control builds on accurate sampling or possibly on-line measurement interpolation. Since the former cannot be guaranteed and the latter adds complexity, the example embodiments below employ a continuous time design. The delays, jitter, and sampling are combined together in an effective delay, and then a continuous time controller is designed. This continuous time controller is discretized and operated as if the measurements are not affected by the effective delay, as will be described further below.

Since the delays are unknown and cannot be measured, the recovery controller is designed to be robust to delay variations. Because the delays cause a phase decrease a feedback part of the example recovery controller is designed for a largest delay possible and to ensure stability and performance for lower delays.

As mentioned, the process control objective is to steer the PQT towards a reference PQT value. There is a closed loop feedback control part of the recovery controller that is based on the measured output from the PQ. It will be described below how PQT and PQL are used in this context. The current transmit data rate for the data flow over the radio interface (the Uu bitrate) is also measured. The current transmit data rate over the radio interface has a direct impact on the PQ, however it cannot be manipulated by the recovery controller. In the automatic process control technology field, such a signal is classified as a measurable disturbance, which can enhance performance by application of feed forward or open loop process control.

The controlled system is intentionally designed for linear control. One benefit of this linearity is that the superposition principle allows for separate design of feedback and feed forward parts of the controller. These separate parts are then combined together to form a combined feedback and feed forward servo controller.

Figure 7:
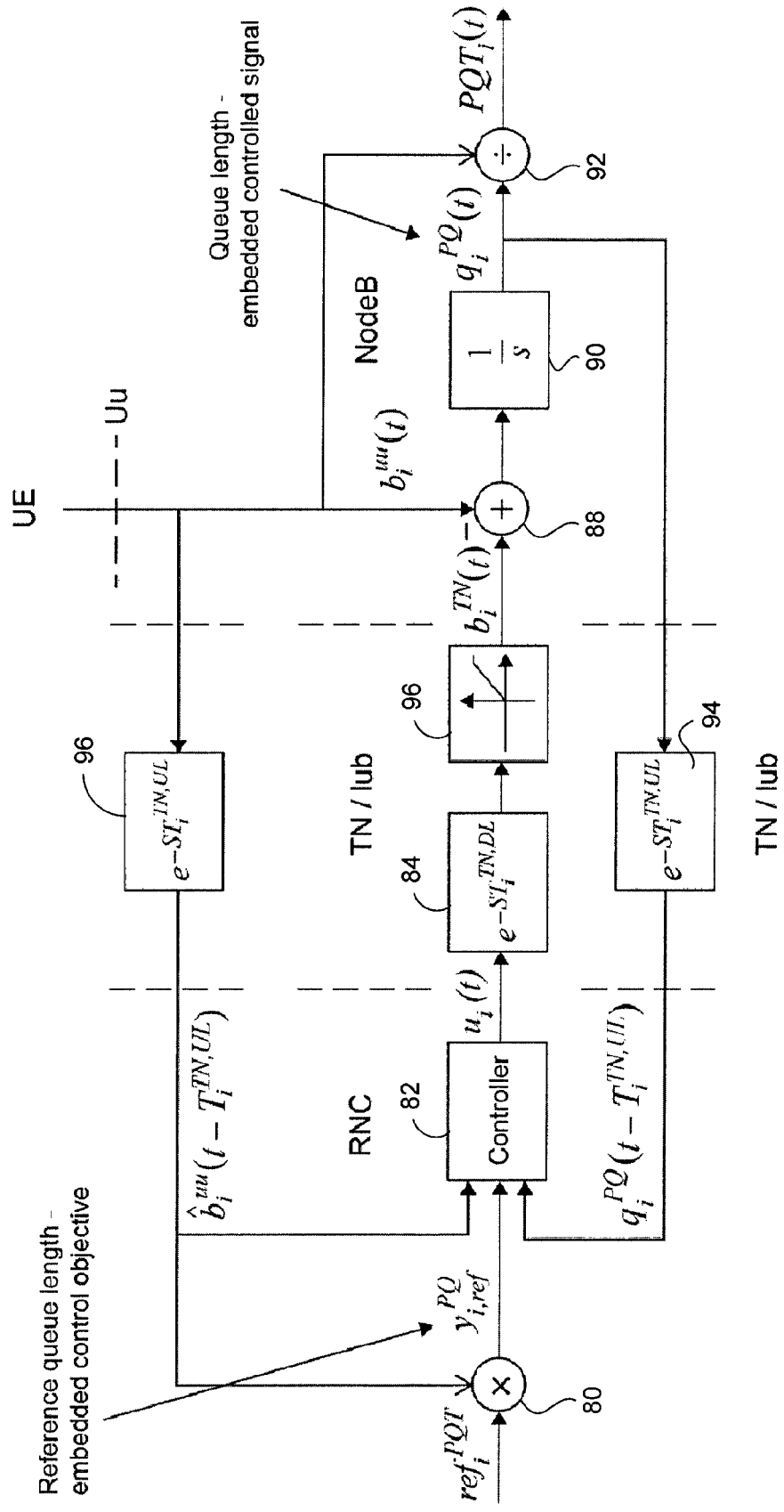
FIG. 7 is a function block diagram showing an example process control for implementing the recovery flow control in accordance with non-limiting example embodiments.

FIG. 7 is a function block diagram showing an example process control for implementing the recovery flow control in accordance with non-limiting example embodiments. The process control output is the commanded bitrate of the data transmission for a data flow from the RNC to the base station. The commanded bitrate transforms to a PQ data volume by integration as is shown in the integrator block 90 in FIG. 7. Integration is a linear and time invariant operation, and a PQT is obtained by the equation $$PQT_i(t) = \frac{q_i^{PQ}(t)}{b_i^{uu}(t)}, \tag{1}$$

where $PQT_i(t)$ is the PQT of flow i at time t, $q_i^{PQ}(t)$ is the PQ data volume of flow i at time t, and where $b_i^{uu}(t)$ is the uu bitrate of flow i at time t. This means the feedback from $PQT_i(t)$ would have to be based on a time varying continuous time model, which the inventors decided was less desirable than the linear time invariant model. The inventors overcame this problem by embedding a linear time invariant controller design in a time varying one. This embedding allows the use of feedback control from a measured $q_i^{PQ}(t)$ (PQL), instead of from a measured $PQT_i(t)$ (PQT), the use of a time varying computed PQ data volume reference $y_{i,ref}(t)$ instead of a PQT reference $ref_i^{PQT}$:

$$y_{i,ref}(t) = ref_i^{PQT} \cdot b_i^{uu}(t). \tag{2}$$

The diagram in FIG. 7 describes the process controller and the controlled system for one data packet flow i, but the technology applies to multiple flows. The Figure illustrates that the controlled system and the controller are distributed between the RBS and the RNC and that the Iub interface is used for data transfer and signaling. The PQT reference $ref_i^{PQT}$ is first multiplied at multiplier 80 with the current Uu bitrate measurement $b_i^{uu}(t-T_i^{TN,UL})$ to produce the reference value for the PQ data volume, $y_{i,ref}(t)$. This operation and the recovery control algorithm implemented in the process controller 82 occur at the RNC. The process controller 82 receives the PQ data volume reference $y_{i,ref}(t)$, the current measured data volume $q_i^{PQ}(t-T_i^{TN,UL})$ and the current measured uu bitrate $b_i^{uu}(t-T_i^{TN,UL})$. Based on these inputs and on internally stored states described below, the controller 82 computes a control signal $u_i(t)$, which is the commanded bitrate to be used for data transfer from the RNC to the RBS during recovery flow control.

In FIG. 7, the RBS is denoted as NodeB following the 3GPP standard. The commanded bitrate is then used for scheduling of data transfer over Iub. The transmission uses the transport network (TN). Depending on what sort of TN is used and the load on the TN, there is a delay $T_i^{TN,DL}$ before the transmitted data stream arrives in the RNC and starts to add to the PQ. That delay is represented by the corresponding Laplace transform $e^{-sT_i^{TN,DL}}$ 84 in FIG. 7. Similarly, the signaling delays associated with the two measurements are represented with the Laplace transform $e^{-sT_i^{TN,UL}}$ 94, 96 in the UL direction. Following the $e^{-sT_i^{TN,DL}}$ delay 84 is a limiter 96 limiting the commanded bitrate to positive values.

The Node B (RBS) implements the PQ as the integrator 90 represented by the Laplace transform $1/s$. The difference between the incoming bitrate $b_i^{TN}(t-T_i^{TN,DL}) = u_i(t)$ and the radio interface Uu bitrate $b_i^{uu}(t)$, is integrated to produce the PQ data volume $q_i^{PQ}(t)$. The PQT (dwell time) is obtained by division with $b_i^{uu}(t)$ at divider 92.

Figure 8:
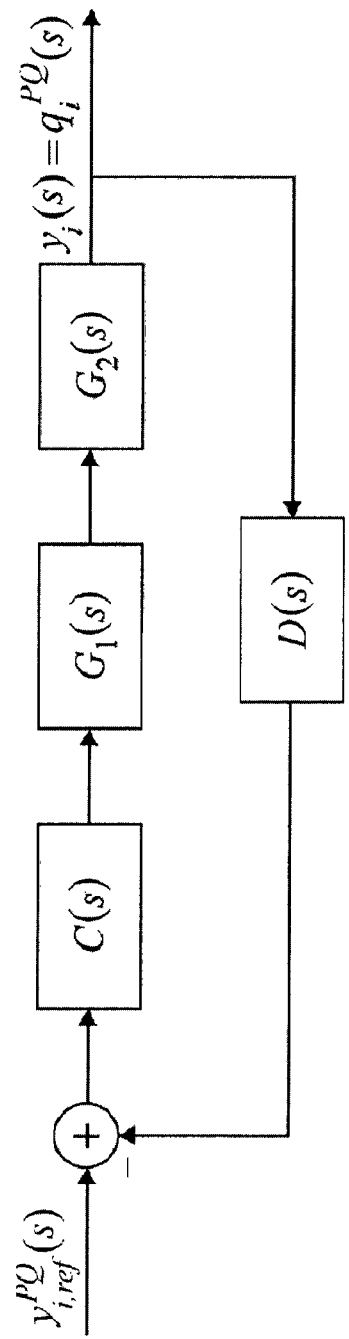
FIG. 8 is a function block diagram showing an example of a feed forward portion of the process control in FIG. 6.

In example embodiments, a lead-lag controller is used for the feedback part of the servo controller for flow control recovery. FIG. 8 is a function block diagram showing an example of a feedback portion of the process control in FIG. 6. To describe the control system used to design the feedback controller C(s), where s is the complex variable of the Laplace transform, the following equations are useful:

$$y_i(s) = \frac{G_0(s)}{1+G_0(s)}\left(\frac{y_{i,ref}^{PQ}(s)}{D(s)}\right) = \frac{G_0(s)}{1+G_0(s)}\bar{y}_{i,ref}^{PQ}(s) \tag{3}$$

$$G_0(s) = G_1(s)G_2(s)C(s)D(s), \tag{4}$$

In (3) and (4), $G_0(s)$ denotes the open loop system, $y_i(s)$ is the data volume (PQL) and $\bar{y}_{i,ref}^{PQ}(s)$ is the desired data volume. The factors of $G_0(s)$ are the transfer delay transfer function $G_1(s)$, the signaling delay transfer function $D_2(s)$, and the PQ transfer function $G_2(s)$. These quantities are explained above and given by equations (5)-(7).

$$G_1(s) = e^{-sT_i^{TN,DL}} \tag{5}$$

$$G_2(s) = \frac{1}{s} \tag{6}$$

$$D(s) = e^{-sT_i^{TN,UL}}. \tag{7}$$

The controller transfer function C(s) is designed to be a lead lag controller here. The transfer function of this controller structure is given by:

$$C(s) = C_{lag}(s)C_{lead}(s) = K\frac{s+a}{s+\frac{a}{M}}N\frac{s+b}{s+bN}, \tag{8}$$

where the controller parameters K, a, M>1, b and N>1 are determined by standard methods to meet the control objectives (settling time and stability).

The standard design procedure may be outlined as follows. First, based on the requirement of meeting the reference value with a certain accuracy in steady state, a desired level of integrating control in the controller is selected by choosing M. The higher the value of M, the more integral action will result. A value close to 10 is used as an example. Second, the parameter a is chosen to be significantly lower than the crossover frequency, e.g., $a=0.05\omega_c$, in order to limit phase loss at the crossover frequency. Third, based on the settling time, a preferred crossover frequency is specified which is defined as the frequency where $|G_0(j\omega_c)|=1$. The result of this choice is a closed loop feedback bandwidth close to the selected crossover frequency. This means that the controller parameters are selected so that this constraint is met. Fourth, based on the stability requirement a desired phase margin $\varphi_{m\ arg\ in}$ is determined, so that the phase at the crossover frequency is $\arg(G_0(j\omega_c))=-180°+\varphi_{m\ arg\ in}$. An example value may be $$\varphi_{margin} = \varphi_{margin}^0 + \frac{180}{\pi}\tan^{-1}(\omega_c M/a) - \frac{180}{\pi}\tan^{-1}(\omega_c/a)$$

to compensate for the phase loss of the lag link. $\varphi_{m\ arg\ in}^0$ is a nominal phase margin, for example 60°. Fifth, the phase advance to be provided by the lead link is computed so that $\arg(G_0(j\omega_c))=-180°+\varphi_{m\ arg\ in}$. This means that the sum of phases $$\varphi_{sum} = \frac{180}{\pi}(\arg(G_1(j\omega_c)) + \arg(G_2(j\omega_c)) + \arg(D(j\omega_c)))$$

is determined, followed by a computation of the required phase advance as $\varphi_{advance} = -180 - \varphi_{sum} + \varphi_{m\ arg\ in}$. Then the parameters of the lead link are computed as $$N = \frac{1 + 2\sin\left(\frac{\pi}{180}\varphi_{advance}\right) + \left(\sin\left(\frac{\pi}{180}\varphi_{advance}\right)\right)^2}{\left(\cos\left(\frac{\pi}{180}\varphi_{advance}\right)\right)^2}.$$

$$b = \frac{\omega_c}{\sqrt{N}}.$$

The gain K is determined to give $|G_0(j\omega_c)|=1$ to meet the definition of the crossover frequency. This means that $$K = \frac{\omega_c\sqrt{\omega_c^2 + a^2}}{\sqrt{N}\sqrt{\omega_c^2 + (a/M)^2}}.$$

Figure 9:
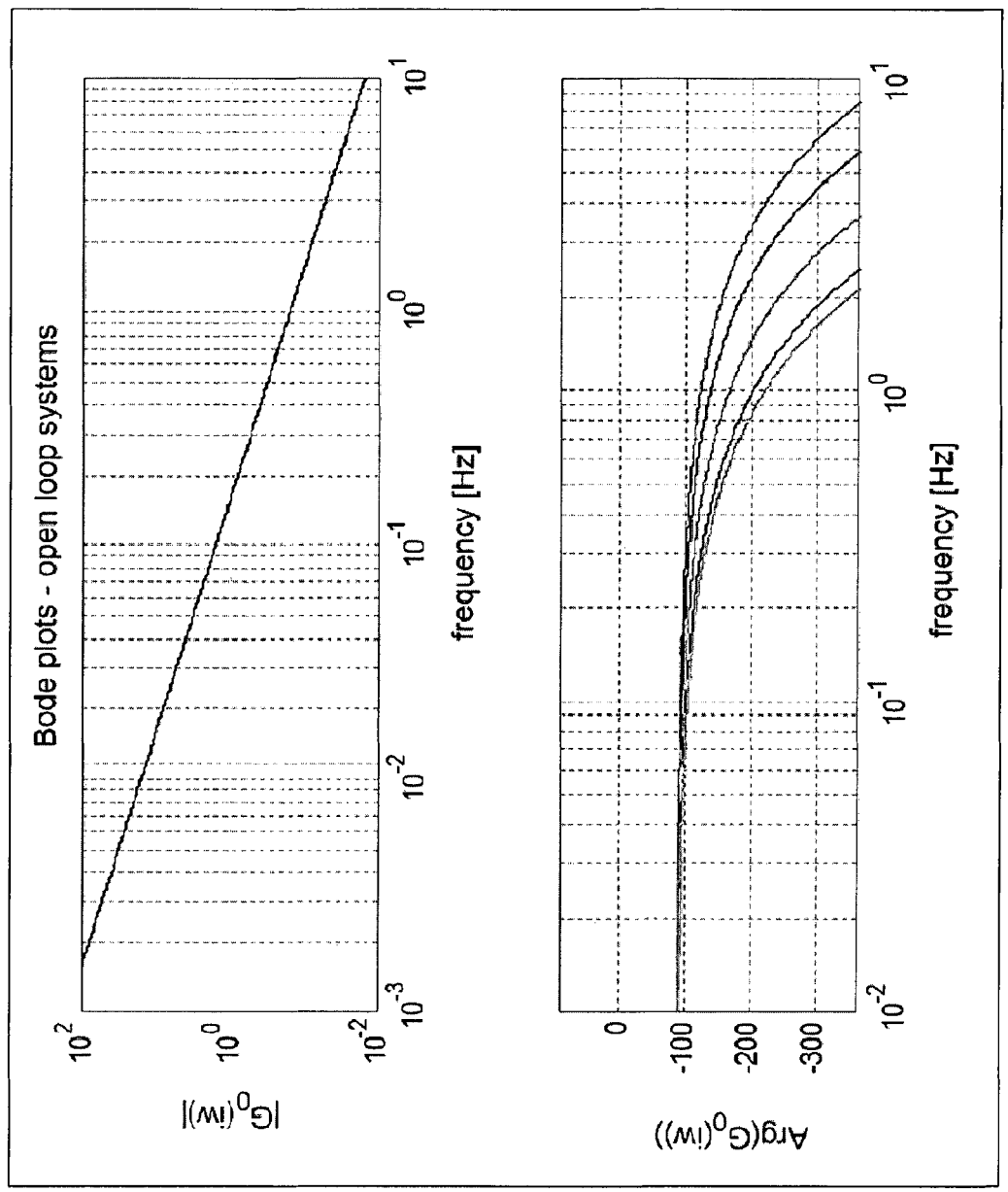
FIG. 9 shows bode plots of an example feedforward portion (open loop) without a controller, i.e., with $G_0(s)=1$.

A non-limiting example design is depicted in FIGS. 9-13. FIG. 9 shows bode plots of an example feedforward portion (open loop) without a controller, i.e., with $G_0(s)=1$ and without any compensation, i.e., C(s) is set to 1. It can be seen that the amplitude curve is the same for all delays, represented by the magnitude of $G_2(s)$. The phase curves are different, with the largest phase loss occurring for the case with the maximum total loop delay.

Figure 10:
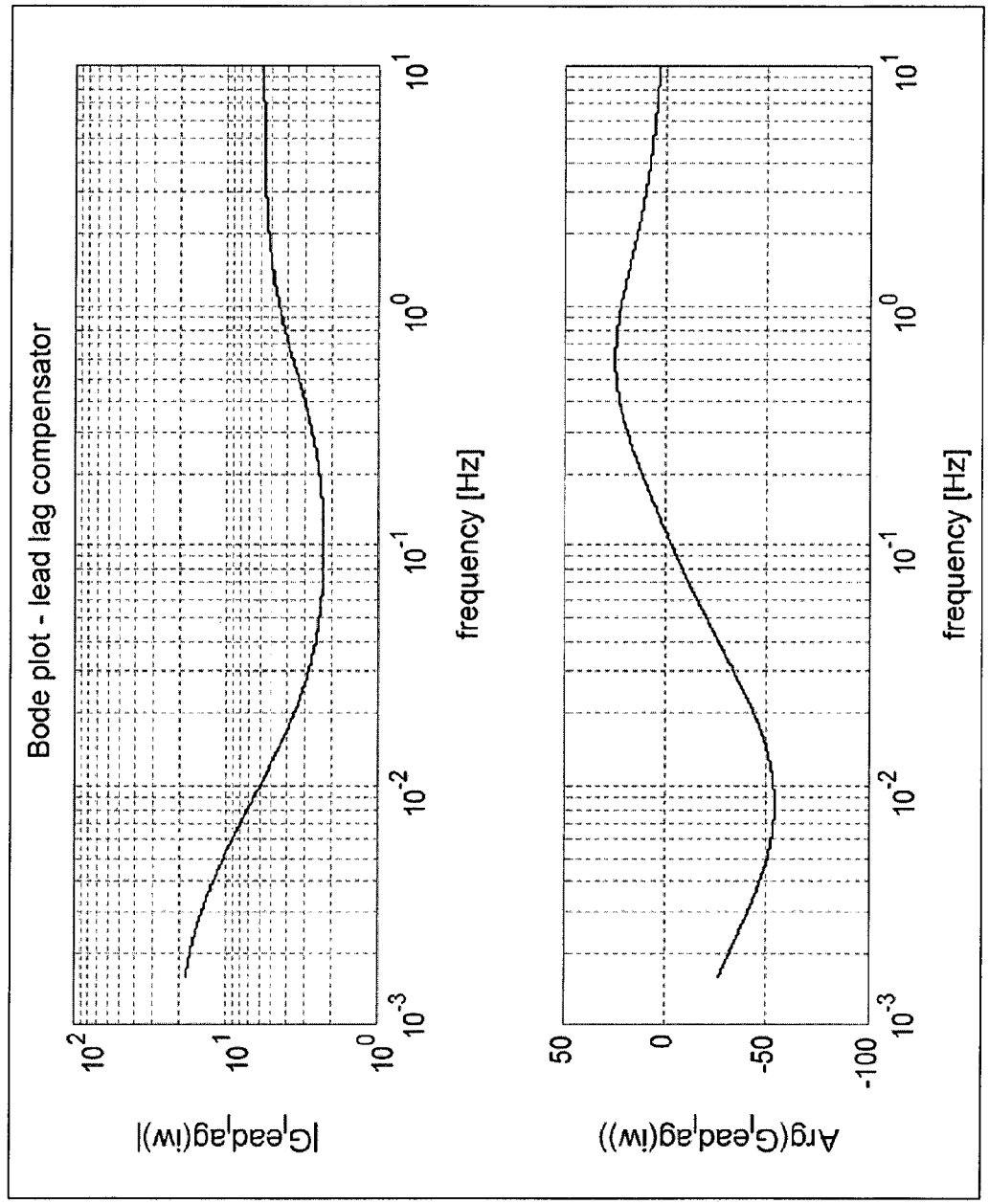
FIG. 10 shows bode plots for an example lead lag controller, designed for a worst case delay, a crossover frequency of 0.65 Hz, and a phase margin of 55 degrees.

FIG. 10 shows bode plots for an example lead lag controller, designed for a worst case delay, a crossover frequency of 0.65 Hz, and a phase margin of 55 degrees. It has a high low frequency gain which is a consequence of the choice of M. The choice corresponds to a leaky integrator in the controller, ensuring that the stationary error becomes sufficiently small. The phase advance reaches a maximum value at the selected cross over frequency of 0.55 Hz.

Figure 11:
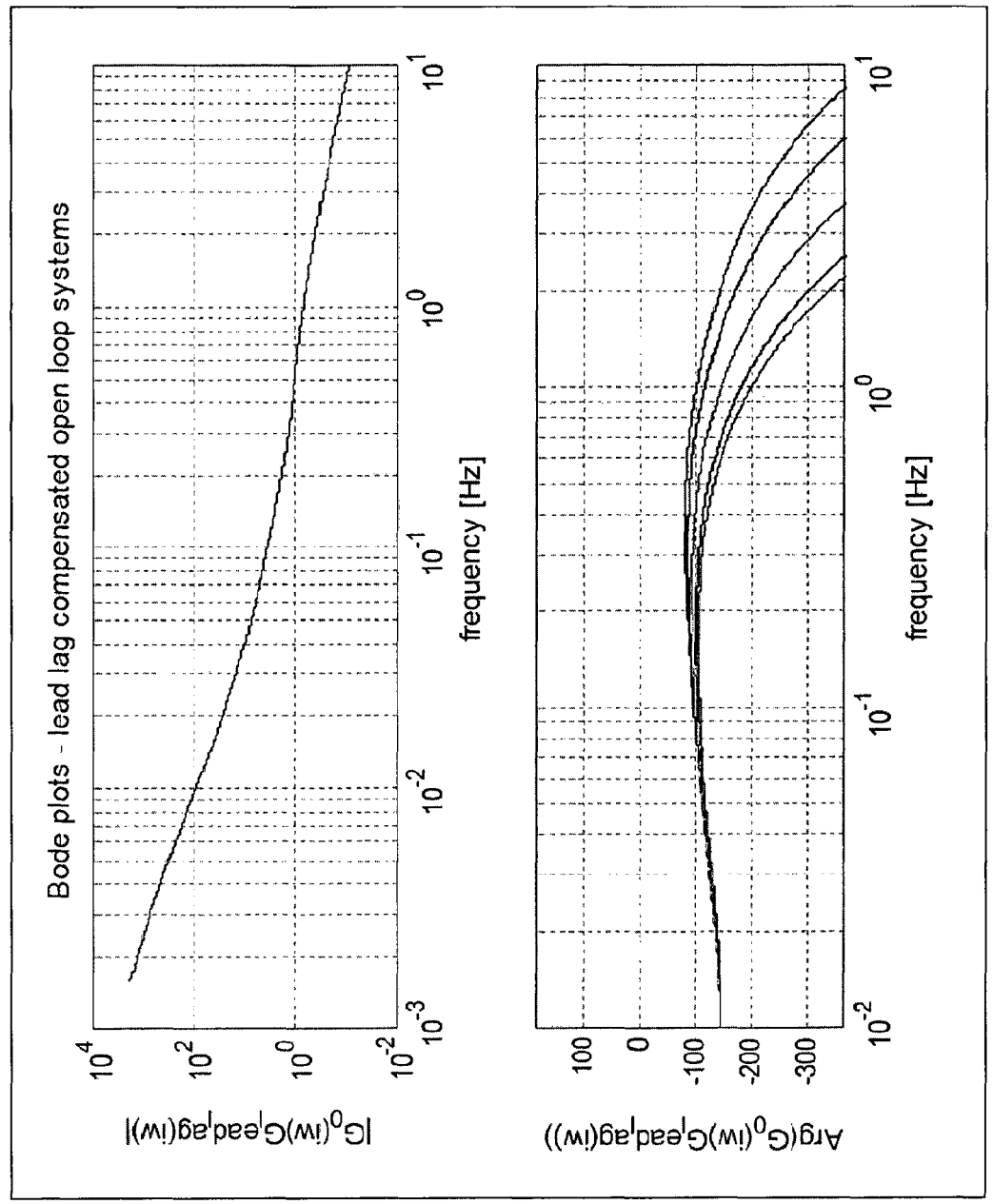
FIG. 11 shows bode plots of the open loop system in FIG. 9 with the lead lag control in FIG. 10.

FIG. 11 shows bode plots of the open loop system in FIG. 9 with the lead lag control in FIG. 10. Note that the phase is well above −180 degrees at the cross over frequency due to the introduced phase advance.

Figure 12:
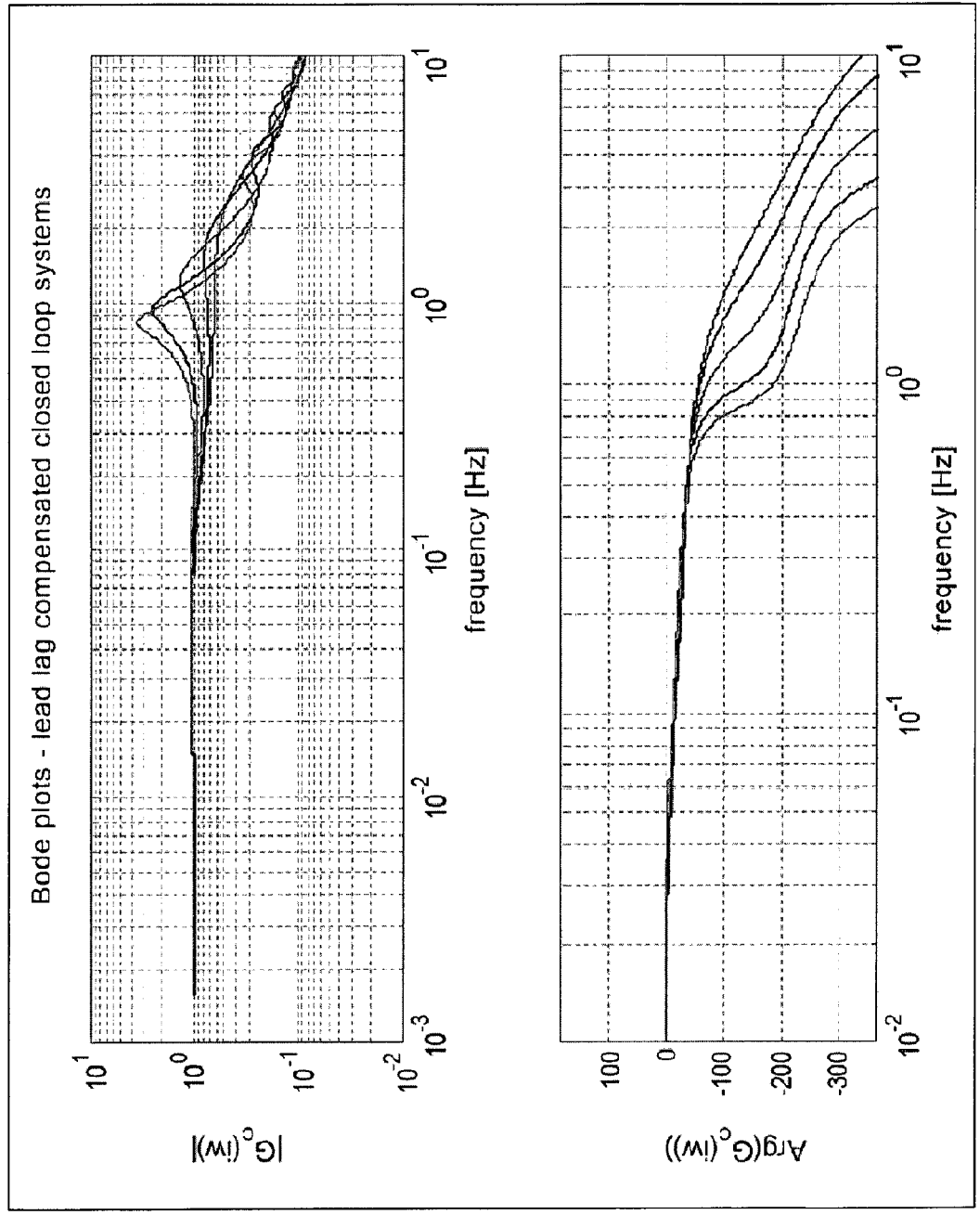
FIG. 12 shows bode plots of a feedback (closed loop) system with the lead lag control in FIG. 10.
Figure 13:
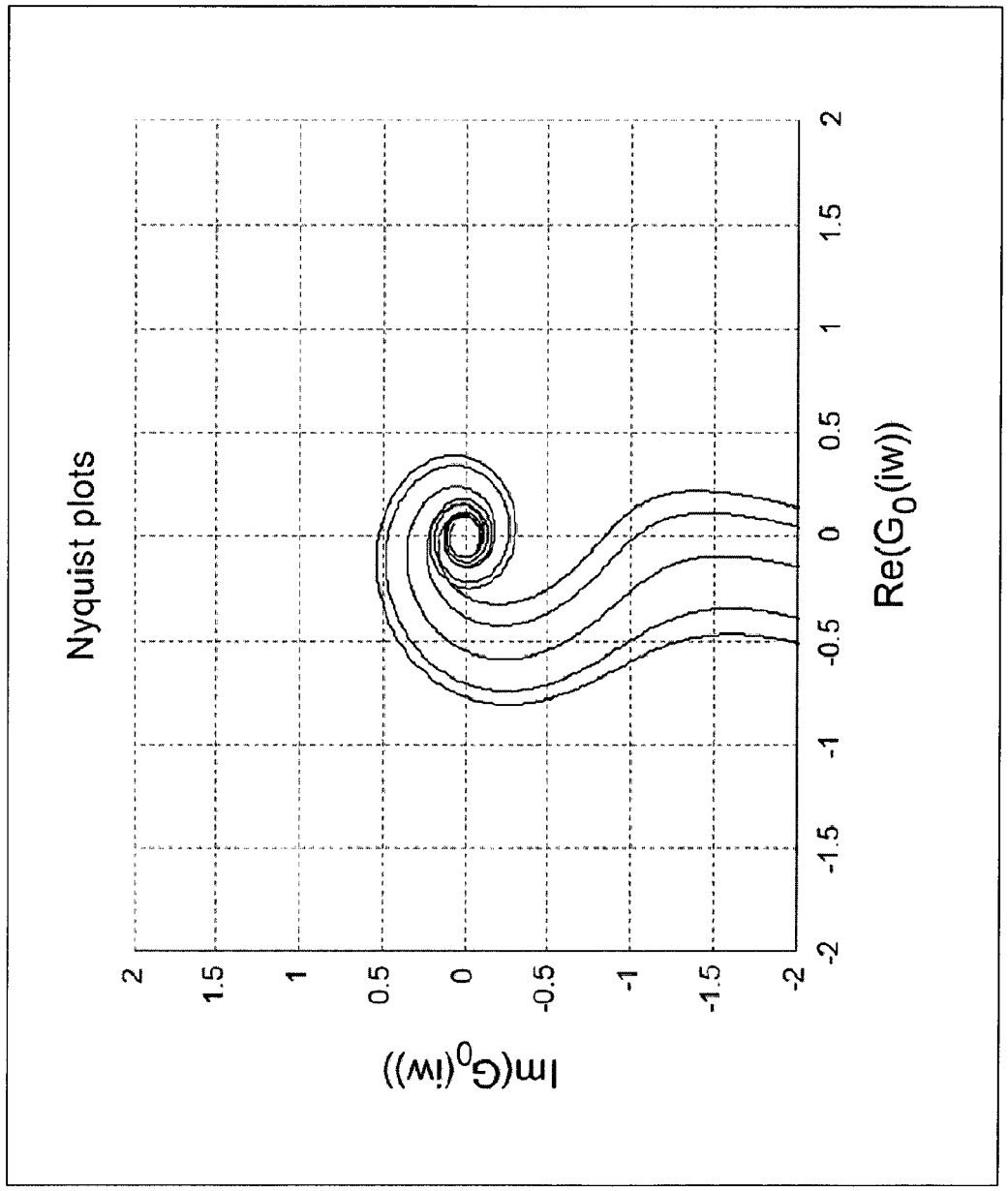
FIG. 13 shows a Nyquist plot of a system with lead lag control.

FIG. 12 shows bode plots of a feedback (closed loop) system with the lead lag control in FIG. 10. There are some moderate resonance peaks that correspond to the repeating poles introduced by the loop delay. However, these are not severe and the controller is expected to behave well. This is confirmed by the Nyquist plot of FIG. 13. Because all curves are to the right of −1, the closed loop system is stable.

The process controller may be implemented in one or more computers. In this case, the continuous time design needs to be transformed to discrete time using a discretization scheme. One example scheme is Tustin's method where a discrete time difference equation is obtained from a continuous time differential equation by the replacement $$s \to \frac{2}{T}\frac{1-q^{-1}}{1+q^{-1}}. \tag{9}$$

Here T denotes the sampling period (typically 40 ms in the present application), and $q^{-1}$ denotes the backward shift operator ($q^{-1}x(t)=x(t-T)$).

By insertion of (9) into (8) and using the control error $$e_i(t)=y_{i,ref}^{PQ}(t)-y_i(t) \tag{10}$$

This results in the following difference equation for the controller computation:

$$u_{i,fb}(t)=r_{fb,1}u_{i,fb}(t-T)+r_{fb,2}u_{i,fb}(t-2T)+s_{fb,0}e(t)+s_{fb,1}e(t-T)+s_{fb,2}e(t-2T) \tag{11}$$

The controller parameters are functions of the continuous time parameters and the sampling period via (9) and are not reproduced here.

Figure 14:
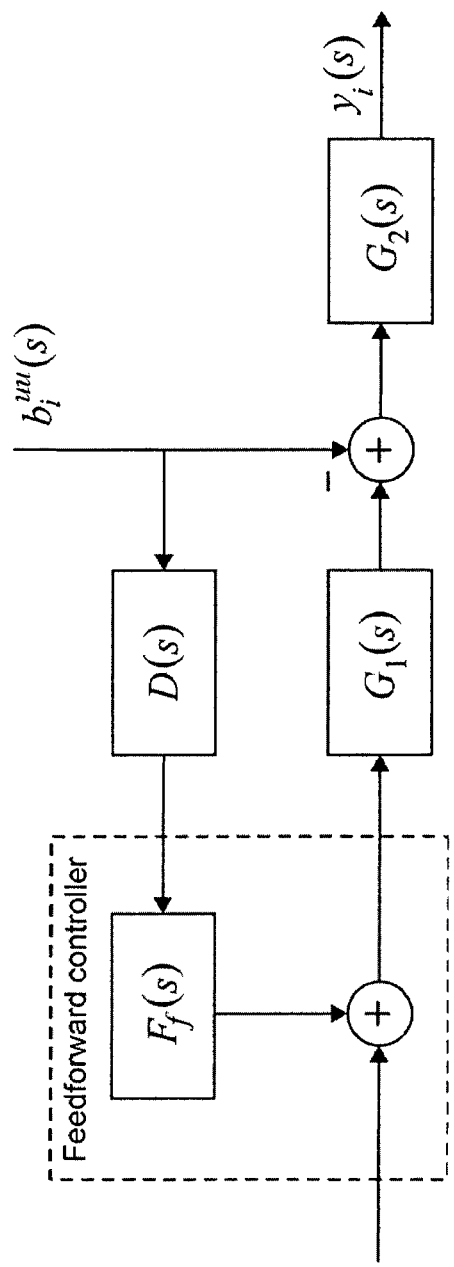
FIG. 14 is a function block diagram showing an example of a feed forward back portion of the process control in FIG. 6.

FIG. 14 is a function block diagram showing an example of a feed forward portion of the process control in FIG. 6. Standard calculations that use the linearity of the block diagram of FIG. 14 show that the output of the feed forward part of the controller can be written as:

$$y_i(s)=G_2(s)(G_1(s)F_f(s)D(s)-1)b_i^{uu}(s). \tag{12}$$

Here $y_i(s)$ is again the data volume of the PQ (PQL), and $b_i^{uu}(s)$ is the (measurable but not controllable) bitrate of flow i. Note that the superposition principle allows neglecting the feedback controller when designing the feed forward part. The objective with the feed forward portion is to cancel the effect of the disturbance on the output; hence, it is desirable that (12) be close to zero. Ideally, this is obtained if the feed forward controller transfer function fulfills.

$$F_f(s) = \frac{1}{D(s)G_1(s)}. \tag{13}$$

Inserting (5) and (7) in (13) results in $$F_f(s)=e^{s(T_i TN,UL+T_i TN,DL)}. \tag{14}$$

Equation (14) represents an exact shift of the signal ahead in time, i.e., the feed forward controller is non-causal and not feasible. Therefore an approximation is needed. A first order Taylor series expansion gives $$F_f(s)\approx 1+s(T_i^{TN,UL}+T_i^{TN,DL}), \tag{15}$$

which replaces the exact shift ahead in time with a prediction ahead in time. Now, as it stands (15) introduces differentiation of the signal (the s) which is undesirable because high frequency disturbances would be amplified. Therefore a final adjustment is introduced where (15) is low pass filtered as $$F_f(s)\approx(1+s(T_i^{TN,UL}+T_i^{TN,DL}))L(s), \tag{16}$$

where L(s) is a low pass filter. In a preferred embodiment a second order filter is used i.e.

$$L(s) = \frac{\omega_0^2}{s^2 + 2\zeta\omega_0 + \omega_0^2}. \tag{17}$$

In (17), $\xi$ is the damping of the low pass filter, and $\omega_0$ denotes the bandwidth in terms of the angular resonance frequency of the second order filter.

Figure 15:
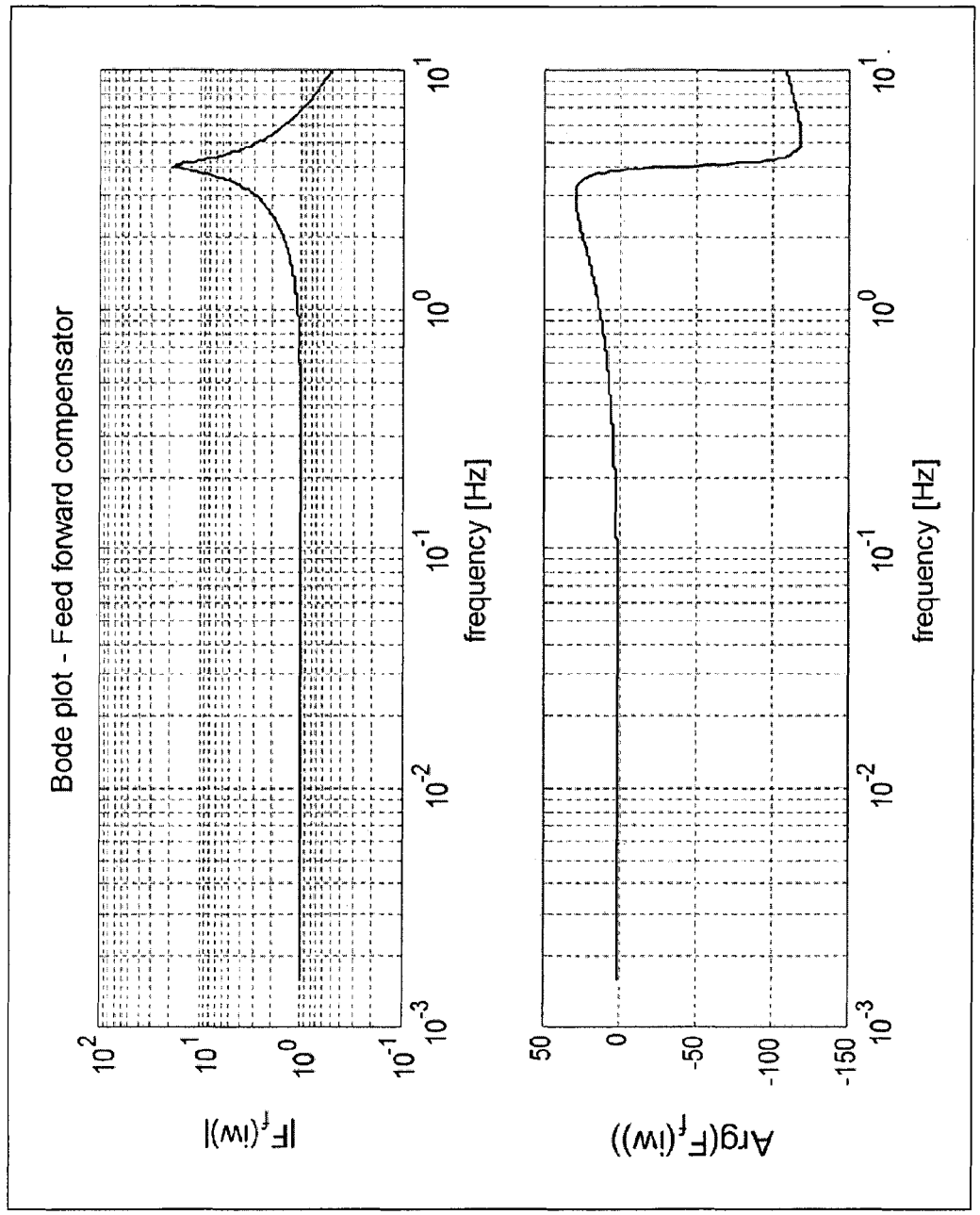
FIG. 15 a frequency response of the feed forward controller in FIG. 14.

An example of the design appears in FIG. 15 in terms of a Bode diagram. The example feed forward controller is designed for a bandwidth of 4 Hz. As can be seen from the phase curve, the controller introduces a phase advance, just like a lead link. Further, the feedforward controller is almost 10 times as fast as the feedback controller, and thus, can handle high frequency parts that the feedback controller cannot.

Again, discretization is performed with Tustin's method (9) and the resulting feed forward regulator becomes $$u_{i,ff}(t)=r_{ff,1}u_{i,ff}(t-T)+r_{ff,2}u_{i,ff}(t-2T)+s_{ff,0}b_i^{uu}(t)+s_{ff,1}b_i^{uu}(t-T)+s_{ff,2}b_i^{uu}(t-2T) \tag{14}$$

The controller parameters are functions of the continuous time parameters and the sampling period via (9) and are not reproduced here.

The feedback controller, the feed forward controller, and the system have so far been assumed linear. As such, the superposition principle applies, and the effect of feedback and feed forward can be added to create the complete servo controller.

Figure 16:
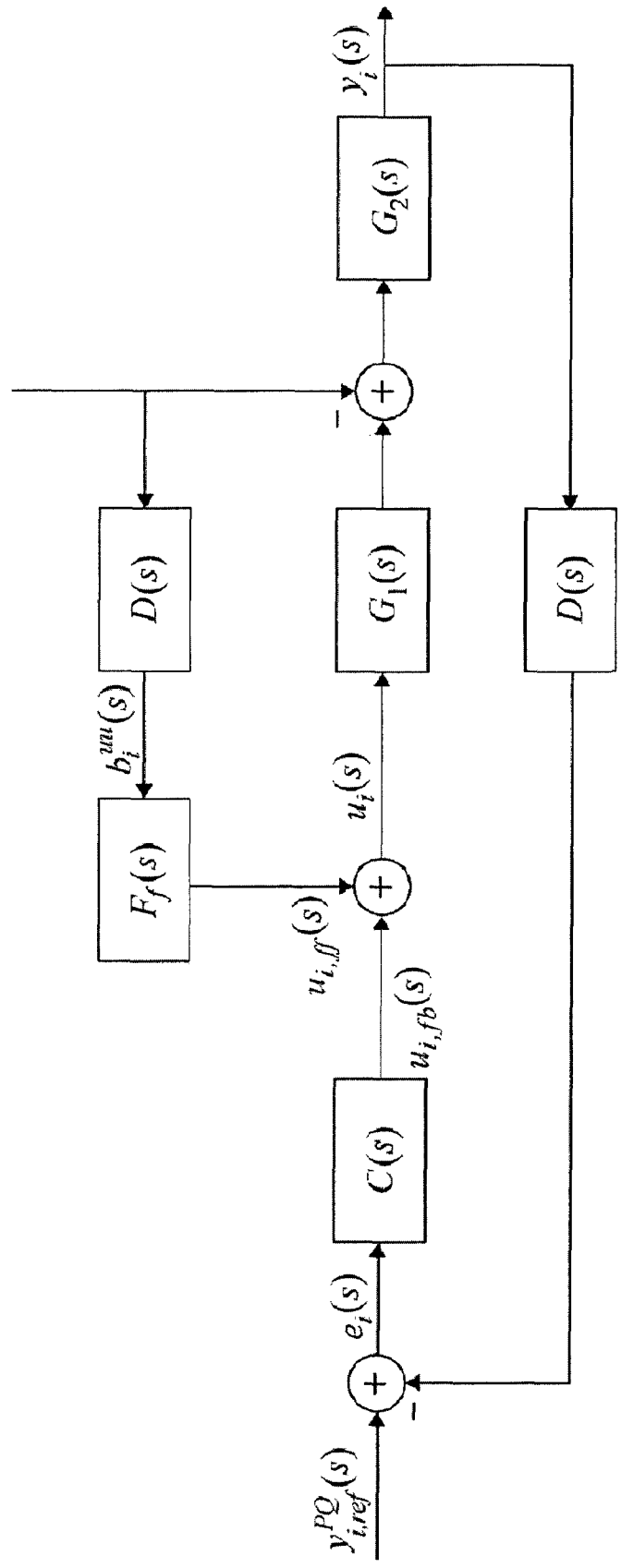
FIG. 16 is a block diagram of an example of a linearly combined feedback and feed forward controller.

FIG. 16 is a block diagram of an example of a linearly combined feedback and feed forward controller. The diagram is the sum of FIG. 7 and FIG. 12. The control signal is the sum of the feedback and feed forward control signals.

One further nonlinear addition is needed. The linear controller may produce negative control commands during the transient phase producing a negative bitrate from the RNC to the Node B, i.e. data transfer in the reverse direction. To avoid this, the following is introduced:

$$u = \max(u_{min}, u_{i,fb}(t) + u_{i,ff}), \quad (15)$$

where $u_{min} \geq 0$ is a preconfigured small minimum bitrate.

In order to study the performance of the controller, recovery control from an initial high PQ data volume and PQT were studied for a non-limiting example. The results of the simulation appear in FIGS. 17-20. It can be seen that the recovery flow controller in all cases steers the PQT to the desired value of 0.125 ms. As can be expected the control is somewhat oscillating in the long delay case.

There are many advantage of the recovery flow control technology described in this application. One example advantage is that the technology ensures that excessive RBS PQ buffers are avoided while still ensuring that sufficient data is available to fully utilize the radio interface bandwidth. Another example advantage is that the recovery control flow mechanism is flexible given that the setting of thresholds and rate at which feedback information is sent may be tailored to suit various feedback delays and buffer target conditions. Further example advantages include: a reduced risk of excessive PQ buffers, this in turn maximizing the utilization of the air interface and maintaining a high throughput; a reduced need for buffer memory in the RBS; and an improved throughput and end-user experience. In terms of flexibility and application, the technology described in this application applies to any other radio system that can use distributed queuing.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a WCDMA context, the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A recovery control method for recovering data packet flow control between a network node and a radio base station over a radio network interface, the base station communicating with at least one user equipment, UE, over a radio interface, the method implemented in the network node and comprising:

obtaining measurement information relating to a data transmission rate over the radio interface from the radio base station to the at least one UE and an amount of data queued in a downlink packet queue in the base station for transmission to the at least one UE;

processing the measurement information, by a process controller in the network node, to determine a desired amount of data to be queued in the downlink packet queue;

determining, by the process controller, a commanded bit rate to transmit data from the network node to the downlink packet queue over the radio network interface, based on the determined desired amount, wherein the process controller performs linear time invariant process control to determine the commanded bit rate; and transmitting, by the network node, data to the radio base station in accordance with the commanded bit rate.

2. The recovery control method in claim 1, further comprising repeating the obtaining, processing, determining, and transmitting steps.

3. The recovery control method in claim 1, wherein the obtaining measurement information includes receiving a message from the radio base station with some or all of the measurement information.

4. The recovery control method in claim 1, further comprising:

activating the recovery control method when a dwell time for data packets queued in the downlink packet queue exceeds a first dwell time threshold, and deactivating the recovery control method when the dwell time for data packets queued in the downlink packet queue is less than a second dwell time threshold or an amount of data queued in the downlink packet queue is less than a data amount threshold.

5. The recovery control method in claim 3, further comprising:

calculating a used data volume using the commanded bit rate until a next measurement information message is received from the radio base station, and discarding, from a buffer in the network node used to store data packets for a data flow associated with the at least one UE, one or more data packets that exceed the calculated used data volume.

6. The recovery control method in claim 1, further comprising:

determining a reference amount of data using a reference dwell time and the measured bit rate over the radio interface, and providing the determined reference amount of data to the process controller which processes the determined reference amount of data along with the measurement information using linear time invariant process control to determine the commanded bit rate.

7. The recovery control method in claim 6, further comprising limiting the commanded bit rate to a non-negative value.

8. The recovery control method in claim 6, further comprising the process controller:

taking into account a first delay associated with transmitting data packets from the network node to the radio base station, and taking into account a second delay associated with signaling the measurement information from the radio base station to the network node.

9. The recovery control method in claim 6, wherein the process controller includes a feedback lead-lag controller and a feed forward controller.

10. A method of operation in a radio base station communicating with at least one user equipment, UE, over a radio interface, the method in the radio base station comprising:
activating a recovery control method for recovering data packet flow control over a radio network interface between the radio base station and a network node providing data packets to the radio base station for transmission to the at least one UE over the radio interface, when a dwell time of such data packets in a downlink packet queue of the radio base station exceeds a first dwell time threshold; and
deactivating the recovery control method when the dwell time is less than a second dwell time threshold or an amount of data in the downlink packet queue is less than a data amount threshold; and
wherein the recovery control method comprises:
measuring information relating to a data transmission rate over the radio interface from the radio base station to the at least one UE and the amount of data in the downlink packet queue;
sending the measurement information to the network node; and
receiving data from the network node at a commanded bit rate that is based on the measurement information such that a desired amount of data for transmission to the at least one UE is queued in the downlink packet queue.

11. The method in claim 10, further comprising repeating the measuring, sending, and receiving steps of the recovery control method one or more times.

12. The method in claim 10, wherein prior to activating the recovery control method, another flow control process was used by the radio base station to control the transmission of data to the at least one UE, and wherein after deactivating the recovery control method, the base station returns to the other flow control process.

13. The method in claim 12, wherein the radio base station communicates with the at least one UE using High Speed Downlink Packet Access (HSDPA) and the other flow control process is based on flow control-based Active Queue Management (AQM) where the radio base station determines the data transmission rate over the radio interface from the radio base station to the at least one UE.

14. Apparatus for a network node for recovering data packet flow control between the network node and a radio base station over a radio network interface, the base station communicating with at least one user equipment, UE, over a radio interface, and the network node apparatus comprising:
one or more processors configured to process measurement information relating to a data transmission rate over the radio interface from the radio base station to the at least one UE and an amount of data queued in a downlink packet queue in the base station for transmission to the at least one UE, to determine a desired amount of data to be queued in the downlink packet queue and to determine a commanded bit rate to transmit data from the network node to the downlink packet queue based on the determined desired amount, wherein the one or more processors are configured to perform linear time invariant process control to determine the commanded bit rate, and
a transmitter configured to transmit data to the radio base station in accordance with the commanded bit rate.

15. The network node apparatus in claim 14, wherein the network node apparatus is configured to repeat the receiving, processing, and transmitting when the receiver receives another message including measurement information from the radio base station.

16. The network node apparatus in claim 14, further comprising a receiver configured to receive a message from the radio base station including some or all of the measurement information.

17. The network node apparatus in claim 14, further comprising a recovery activator controller configured to:
activate the recovery control method when a dwell time for data packets queued in the downlink packet queue exceeds a first dwell time threshold, and
deactivate the recovery control method when the dwell time for data packets queued in the downlink packet queue is less than a second dwell time threshold or an amount of data queued in the downlink packet queue is less than a data amount threshold.

18. The network node apparatus in claim 16, wherein the one or more processors are configured to:
calculate a used data volume using the commanded bit rate until a next measurement information message is received from the radio base station, and
discard, from a buffer in the network node used to store data packets for a data flow associated with the at least one UE, one or more data packets that exceed the calculated used data volume.

19. The network node apparatus in claim 14, wherein the one or more processors are configured to:
determine a reference amount of data using a reference dwell time and the measured bit rate over the radio interface, and
provide the determined reference amount of data to the one or more processors, which are configured to process the determined reference amount of data along with the measurement information using linear time invariant process control, to determine the commanded bit rate.

20. The network node apparatus in claim 19, further comprising a limiter configured to limit the commanded bit rate to a non-negative value.

21. The network node apparatus in claim 19, wherein the one or more processors are configured to:
take into account a first delay associated with transmitting data packets from the network node to the radio base station, and
take into account a second delay associated with signaling the measurement information from the radio base station to the network node.

22. The network node apparatus in claim 19, wherein the one or more processors include a lead-lag feedback controller and a feed forward controller.

23. The network node apparatus in claim 14, where the network node is a radio network controller or a core network node.

24. An apparatus for a radio base station configured for communicating with at least one user equipment, UE, over a radio interface, the radio base station apparatus comprising:
one or more processors configured to:
activate a recovery control operation for recovering data packet flow control over a radio network interface between the radio base station and a network node providing data packets to the radio base station for transmission to the at least one UE over the radio interface, when a dwell time of such data packets in a downlink packet queue of the radio base station exceeds a first dwell time threshold; and deactivate the recovery control method when the dwell time is less than a second dwell time threshold or an amount of data in the downlink packet queue is less than a data amount threshold; and wherein, for the recovery control operation, the one or more processors are configured to:

measure information relating to a data transmission rate over the radio interface from the radio base station to the at least one UE and the amount of data in the downlink packet queue in the base station;

send, via a transmitter, a message including the measurement information to the network node; and receive, via a receiver, data from the network node at a commanded bit rate based on the measurement information such that a desired amount of data for transmission to the at least one UE is queued in the downlink packet queue.

25. The radio base station apparatus of claim 24, further comprising another flow controller, wherein prior to activating the recovery control procedure, the other flow controller is configured to control the transmission of data to the at least one UE, and wherein after deactivating the recovery control procedure, the other flow controller is configured to control the transmission of data from the radio base station to the at least one UE.

26. The radio base station apparatus of claim 24, wherein the radio base station is configured to communicate with the at least one UE using High Speed Downlink Packet Access (HSDPA) and the other flow controller is configured to use flow control-based Active Queue Management (AQM) to determine the data transmission rate over the radio interface from the radio base station to the at least one UE.

* * * * *

UNITED STATES PATENT AND TRADEMARK OFFICE
CERTIFICATE OF CORRECTION

PATENT NO. : 9,967,769 B2  
APPLICATION NO. : 14/900848  
DATED : May 8, 2018  
INVENTOR(S) : Wigren et al.

Page 1 of 2

It is certified that error appears in the above-identified patent and that said Letters Patent is hereby corrected as shown below:

In Fig. 4, Sheet 4 of 20, for Step "S11", in Line 2, delete "data be" and insert -- data to be --, therefor.

In Column 1, Line 34, delete "PDU's" and insert -- PDUs --, therefor.

In Column 1, Line 53, delete "(PDU's)" and insert -- (PDUs) --, therefor.

In Column 1, Line 54, delete "SUFI's)." and insert -- SUFIs). --, therefor.

In Column 1, Line 67, delete "PDU's" and insert -- PDUs --, therefor.

In Column 2, Line 31, delete "PQ's" and insert -- PQs --, therefor.

In Column 2, Line 38, delete "radio network" and insert -- radio access network --, therefor.

In Column 4, Line 60, delete "FIG. 15 a" and insert -- FIG. 15 is a --, therefor.

Figure 17:
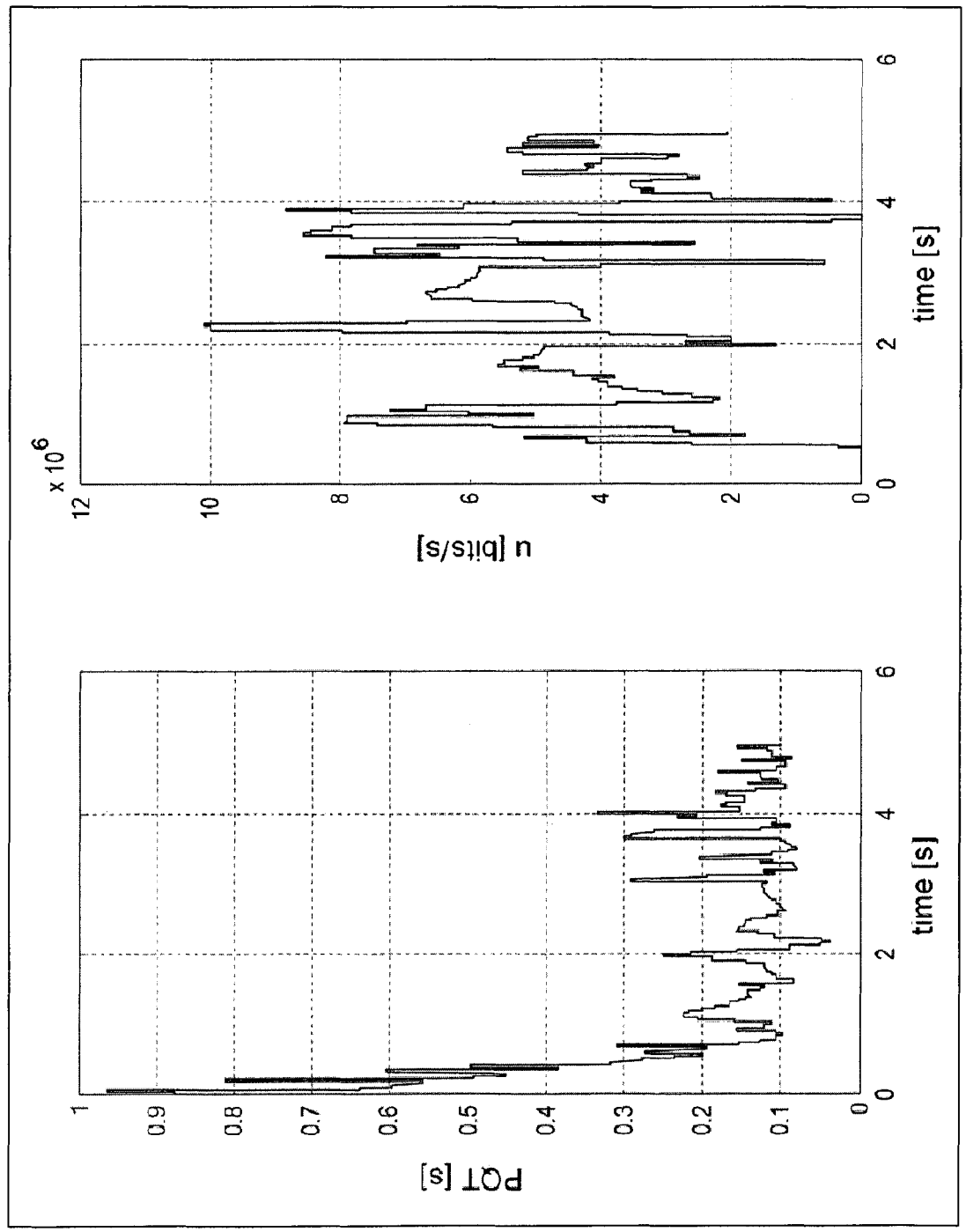
FIG. 17 graphs controlled PQT for a lower delay case.

In Column 4, Line 64, delete "FIG. 17" and insert -- FIG. 17 are --, therefor.

Figure 18:
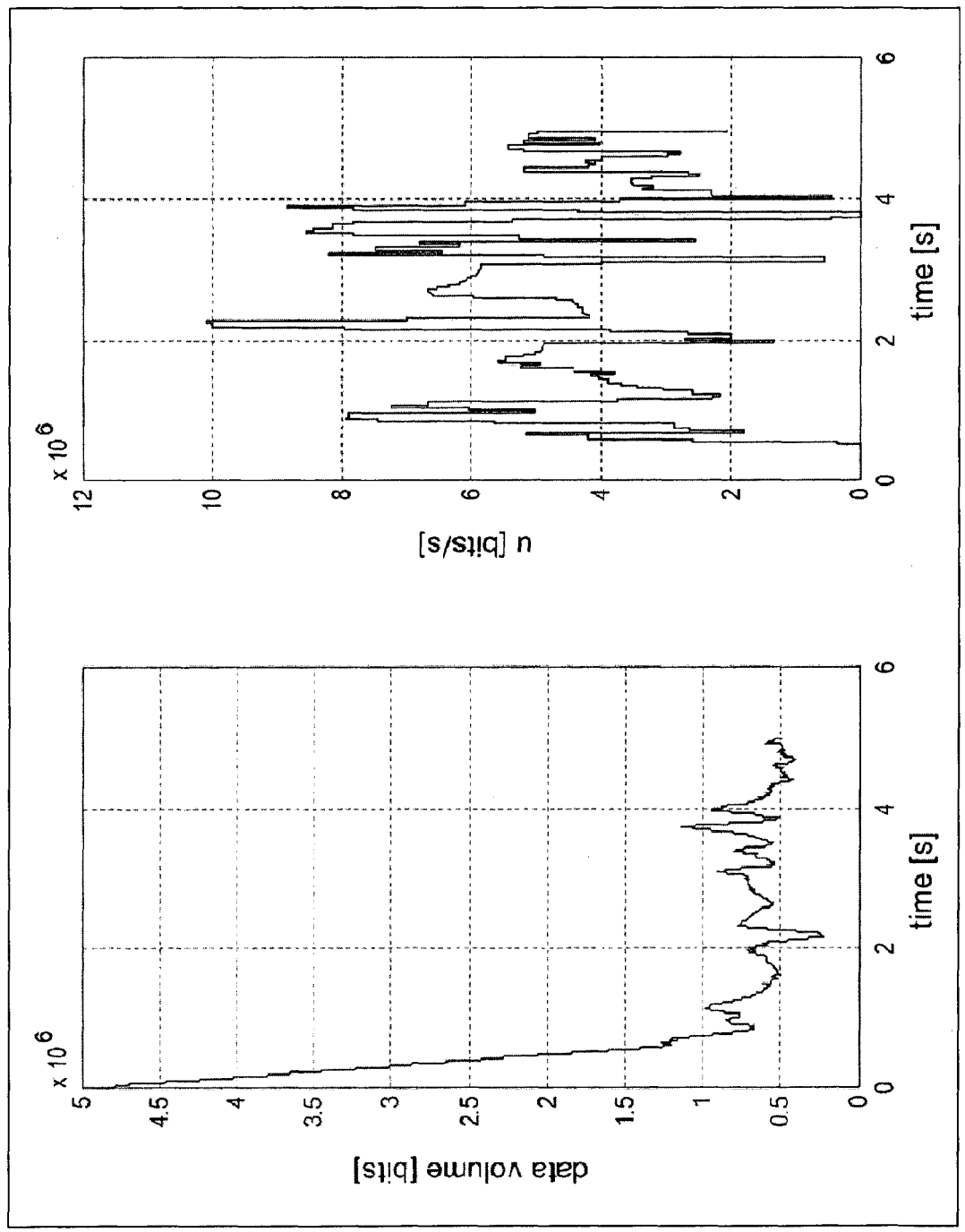
FIG. 18 graphs controlled PQL or buffer data volume/amount for a lower delay case.

In Column 4, Line 65, delete "FIG. 18" and insert -- FIG. 18 are --, therefor.

Figure 19:
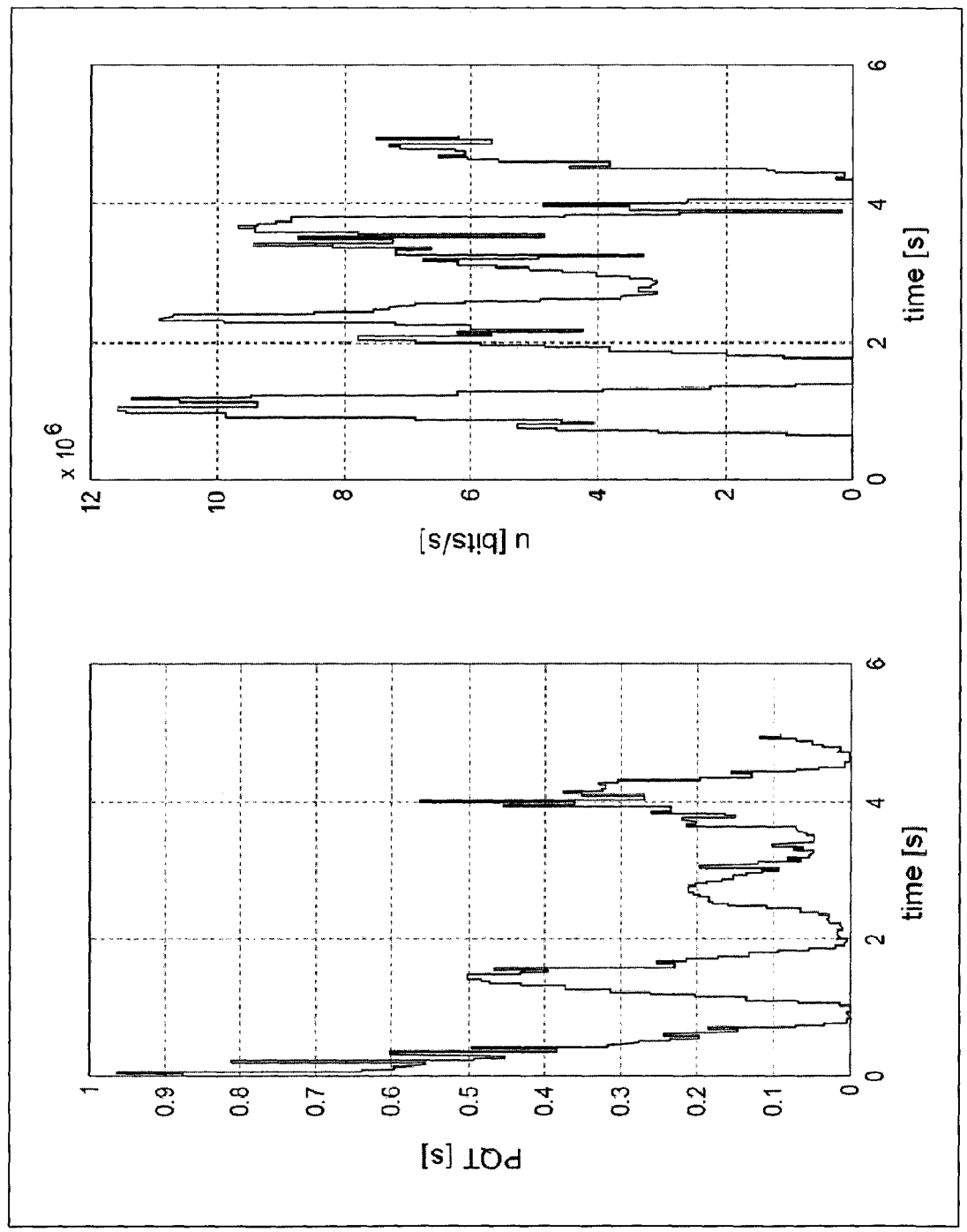
FIG. 19 graphs controlled PQT for a higher delay case.

In Column 4, Line 67, delete "FIG. 19" and insert -- FIG. 19 are --, therefor.

Figure 20:
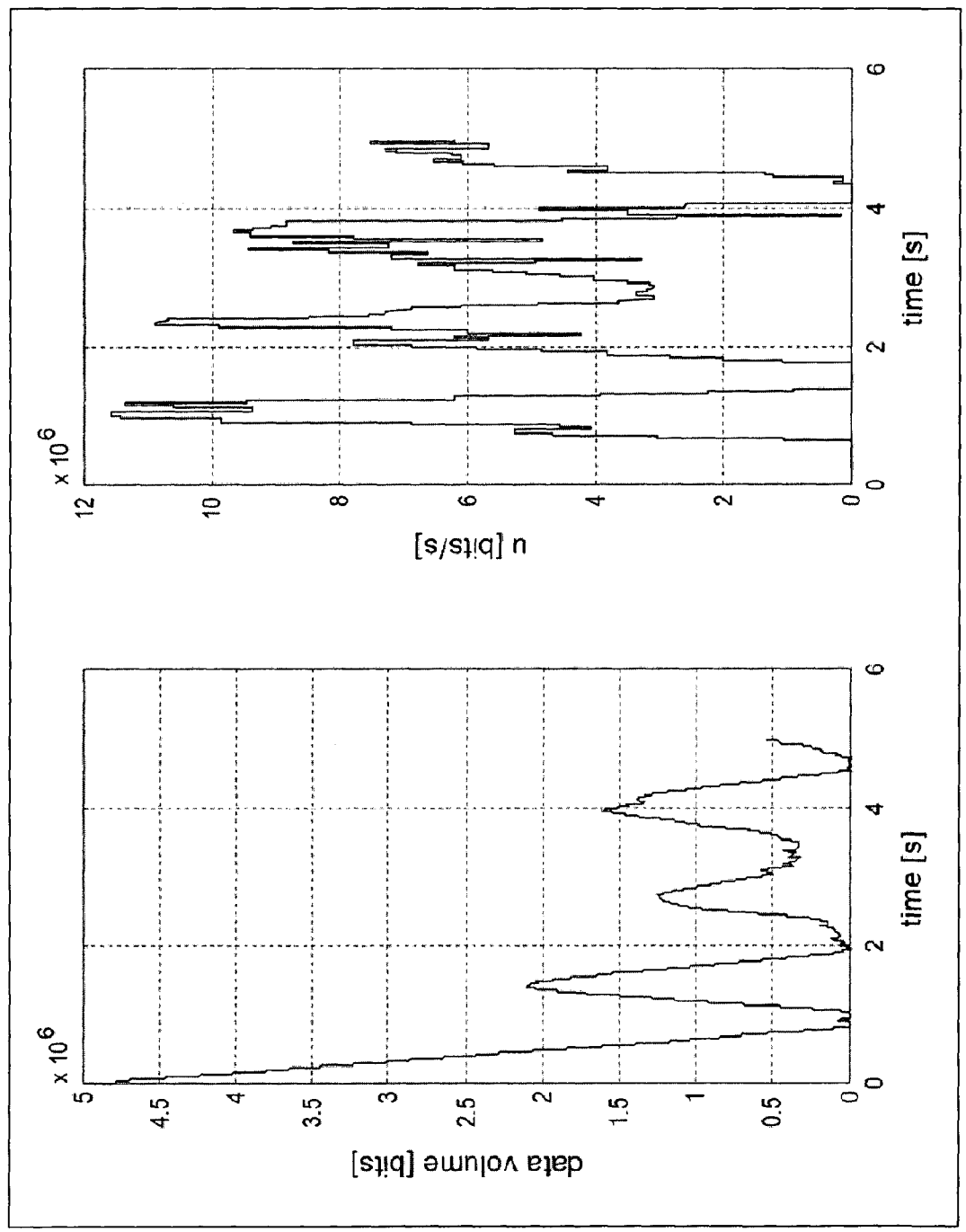
FIG. 20 graphs controlled PQL or buffer data volume/amount for a higher delay case.

In Column 5, Line 1, delete "FIG. 20" and insert -- FIG. 20 are --, therefor.

In Column 7, Line 40, delete "(step S5)." and insert -- (step S6). --, therefor.

In Column 8, Line 3, delete "Tub" and insert -- Iub --, therefor.

In Column 9, Line 4, delete "Transport" and insert -- Transmission --, therefor.

Signed and Sealed this  
Sixth Day of November, 2018

Andrei Iancu  
*Director of the United States Patent and Trademark Office*

CERTIFICATE OF CORRECTION (continued)
U.S. Pat. No. 9,967,769 B2

In Column 9, Line 24, delete "detector 26" and insert -- detector 28 --, therefor.

In Column 9, Line 31, delete "date" and insert -- data --, therefor.

In Column 10, Line 35, delete "decrease a" and insert -- decrease, a --, therefor.

In Column 12, Line 44, delete "requirement a" and insert -- requirement of a --, therefor.

In Column 12, Line 45, delete "φ$_{m\ arg\ in}$" and insert -- φ$_{margin}$ --, therefor.

In Column 12, Line 46, delete "φ$_{m\ arg\ in}$." and insert -- φ$_{margin}$. --, therefor.

In Column 12, Line 55, delete "φ$_{m\ arg\ in}$⁰" and insert -- φ$_{margin}^{0}$ --, therefor.

In Column 12, Line 57, delete "φ$_{m\ arg\ in}$." and insert -- φ$_{margin}$. --, therefor.

In Column 12, Line 66, delete "φ$_{m\ arg\ in}$." and insert -- φ$_{margin}$. --, therefor.

In Column 14, Line 26, delete "$F_j(s)=e^{s(T_j TN,UL+TTN,DL)}.|$" and insert -- $F_j(s)=e^{s(T_j TN,UL+T_j TN,DL)}.$ --, therefor.

In Column 14, Line 64, delete "(14)" and insert -- (18) --, therefor.

In Column 15, Line 15, delete "(15)" and insert -- (19) --, therefor.

In Column 15, Line 16, delete "u=max(u$_{min}$,u$_{i,fb}$(t)+u$_{i,ff}$))," and insert -- u=max(u$_{min}$,u$_{i,fb}$(t)+u$_{i,ff}$(t)), --, therefor.

In Column 16, Line 6, in Claim 1, delete "UE" and insert -- UE, --, therefor.

In Column 17, Line 64, in Claim 14, delete "queue" and insert -- queue, --, therefor.